US010575241B2

(12) United States Patent
Pang et al.

(10) Patent No.: US 10,575,241 B2
(45) Date of Patent: Feb. 25, 2020

(54) METHOD FOR SERVICE DISCOVERY IN NEIGHBOR AWARENESS NETWORK NAN, AND TERMINAL DEVICE

(71) Applicant: Huawei Technologies Co., Ltd., Shenzhen (CN)

(72) Inventors: Gaokun Pang, Shenzhen (CN); Ping Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/067,504

(22) PCT Filed: Dec. 30, 2015

(86) PCT No.: PCT/CN2015/099841
§ 371 (c)(1),
(2) Date: Jun. 29, 2018

(87) PCT Pub. No.: WO2017/113176
PCT Pub. Date: Jul. 6, 2017

(65) Prior Publication Data
US 2019/0021044 A1 Jan. 17, 2019

(51) Int. Cl.
*H04W 48/10* (2009.01)
*H04L 29/08* (2006.01)
(Continued)

(52) U.S. Cl.
CPC ............ *H04W 48/10* (2013.01); *H04L 45/02* (2013.01); *H04L 67/16* (2013.01); *H04L 67/28* (2013.01);
(Continued)

(58) Field of Classification Search
CPC ..... H04W 8/005; H04W 48/16; H04W 48/10; H04W 84/18; H04W 88/04; H04W 40/24;
(Continued)

(56) References Cited

U.S. PATENT DOCUMENTS

2015/0036540 A1 2/2015 Kasslin et al.
2015/0071121 A1* 3/2015 Patil ...................... H04W 40/24
370/255
(Continued)

FOREIGN PATENT DOCUMENTS

CN 104349285 A 2/2015
CN 104661260 A 5/2015
(Continued)

OTHER PUBLICATIONS

"Neighbor Awareness Networking Technical Specification version v1.0," XP055258740, May 2015, 98 pages.
(Continued)

*Primary Examiner* — Marsha D Banks Harold
*Assistant Examiner* — Elton Williams
(74) *Attorney, Agent, or Firm* — Conley Rose, P.C.

(57) ABSTRACT

A method for service discovery in a neighbor awareness network (NAN), and a terminal device, where the method includes receiving, by a first device, a first service discovery message sent by a second device, where the first service discovery message carries service identifier information and first path information, and the first path information includes identifier information of the service initiating device, or identifier information of the second device and the service initiating device, determining, by the first device, second path information according to the first path information, where the second path information includes the identifier information of the service initiating device and identifier information of the first device, and sending, by the first device, a second service discovery message, where the second service discovery message carries the service identifier information and the second path information.

14 Claims, 5 Drawing Sheets

(51) Int. Cl.
*H04W 8/00* (2009.01)
*H04W 56/00* (2009.01)
*H04L 12/751* (2013.01)
*H04W 40/24* (2009.01)
*H04W 40/12* (2009.01)
*H04W 72/00* (2009.01)
*H04W 88/04* (2009.01)

(52) U.S. Cl.
CPC ........... *H04W 8/005* (2013.01); *H04W 40/12* (2013.01); *H04W 40/246* (2013.01); *H04W 56/00* (2013.01); *H04W 56/001* (2013.01); *H04W 72/005* (2013.01); *H04W 88/04* (2013.01)

(58) Field of Classification Search
CPC ............. H04W 40/248; H04W 40/246; H04W 56/001; H04L 67/16; H04L 67/28; H04L 41/12; H04L 45/00; H04L 45/26; H04L 45/46
See application file for complete search history.

(56) References Cited

U.S. PATENT DOCUMENTS

| | | | |
|---|---|---|---|
| 2015/0081840 A1* | 3/2015 | Patil | H04L 67/28 709/217 |
| 2015/0172901 A1 | 6/2015 | Kasslin et al. | |
| 2015/0200811 A1* | 7/2015 | Kasslin | H04L 41/12 370/254 |
| 2015/0223047 A1 | 8/2015 | Abraham et al. | |
| 2016/0270137 A1* | 9/2016 | Yong | H04W 8/005 |
| 2016/0309404 A1 | 10/2016 | Kasslin et al. | |

FOREIGN PATENT DOCUMENTS

| | | |
|---|---|---|
| CN | 104716993 A | 6/2015 |
| WO | 2015187255 A1 | 12/2015 |

OTHER PUBLICATIONS

Foreign Communication From a Counterpart Application, European Application No. 15911805.8, Extended European Search Report dated Nov. 2, 2018, 11 pages.
"Wi-Fi Alliance, Wi-Fi Neighbor Awareness Networking (NAN), Wi-Fi NAN Technical Specification Contribution," Version 0.0 (TG Baseline r12), Jan. 27, 2014, 83 pages.
Machine Translation and Abstract of Chinese Publication No. CN104661260, May 27, 2015, 21 pages.
"Part 11: Wireless LAN Medium Access Control (MAC) and Physical Layer (PHY) Specifications," IEEE Computer Society, IEEE Std 802.11, Part 1, Mar. 29, 2012, 1396 pages.
"Part 11: Wireless LAN Medium Access Control (MAC) and Physical Layer (PHY) Specifications," IEEE Computer Society, IEEE Std 802.11, Part 2, Mar. 29, 2012, 1397 pages.
"Wi-Fi Alliance Technical Task Group, Wi-Fi Neighbor Awareness Networking (NAN), Wi-Fi NAN Technical Specification Contribution," Version 0.0 (TG Baseline r12), Jan. 27, 2014, 83 pages.
Foreign Communication From A Counterpart Application, PCT Application No. PCT/CN2015/099841, English Translation of International Search Report dated Sep. 21, 2016, 2 pages.
Foreign Communication From A Counterpart Application, PCT Application No. PCT/CN2015/099841, English Translation of Written Opinion dated Sep. 21, 2016, 5 pages.
Foreign Communication From A Counterpart Application, Chinese Application No. 201580085376.X, Chinese Office Action dated Sep. 27, 2019, 4 pages.
Foreign Communication From A Counterpart Application, Chinese Application No. 201580085376.X, Chinese Search Report dated Sep. 19, 2019, 2 pages.

* cited by examiner

METHOD FOR SERVICE DISCOVERY IN NEIGHBOR AWARENESS NETWORK NAN, AND TERMINAL DEVICE

CROSS-REFERENCE TO RELATED APPLICATIONS

This application is a U.S. National Stage of International Patent Application No. PCT/CN2015/099841 filed on Dec. 30, 2015, which is hereby incorporated by reference in its entirety.

TECHNICAL FIELD

The present disclosure relates to the communications field, and more further, to a method for service discovery in a neighbor awareness network (NAN), and a terminal device.

BACKGROUND

A NAN is a standard defined by the Wireless Fidelity Alliance (WFA). A function of the standard is to synchronize all devices joining the NAN network without a central node and to perform maintenance work and service discovery work of the NAN network in an agreed discovery window (DW).

After a device completes service discovery, the device needs to establish data communication with a target device. In NAN 2.0, a NAN data link (NDL) needs to be established for data communication between devices. The conventional NAN technology supports only service discovery and data transmission between devices within a one-hop range (within a wireless transmission distance, it may also be understood that no forwarding is required during data transmission), but does not support service discovery and data transmission between devices within a multi-hop range (beyond the wireless transmission distance, it may also be understood that data needs to be forwarded to arrive at a target device). In conventional multi-hop data transmission modes in other networks, a device needs to establish a multi-hop path with a target device, and then perform data transmission by using the path. If a conventional multi-hop path discovery method in other networks is directly used, a connection needs to be first established between every two NAN devices. A process of establishing a connection relationship needs to consume a large quantity of air interface messages. However, the NAN network has a loose structure, and devices can communicate without establishing a connection relationship. In addition, a path discovery process and a path establishment process both need to consume a large quantity of air interface messages, and occupy a large quantity of time-frequency resources.

SUMMARY

Embodiments of the present disclosure provide a method for service discovery in a NAN, and a terminal device to implement a path discovery process in a service discovery process in order to reduce numerous air interface messages and save numerous time-frequency resources.

According to a first aspect, a method for service discovery in a NAN is provided, where the method includes receiving, by a first device, a first service discovery message sent by a second device, where the first service discovery message carries service identifier information and first path information, the service identifier information indicates a service queried by a service initiating device or a service supported by the service initiating device, the second device is the service initiating device or a service forwarding device, and the first path information includes identifier information of the service initiating device, or identifier information of the second device and the service initiating device, determining, by the first device, second path information according to the first path information, where the second path information includes the identifier information of the service initiating device and identifier information of the first device, and sending, by the first device, a second service discovery message, where the second service discovery message carries the service identifier information and the second path information.

In this implementation, the first device is a service forwarding device, and the second device may be the service initiating device or another service forwarding device. The first device can transfer, by forwarding the first service discovery message of the first device, the service discovery message sent by the service initiating device such that a service responding device that can provide the service queried by the service initiating device or a service responding device that requires the service supported by the service initiating device can be discovered. The service discovery message or a forwarded message of the service discovery message further carries path information, where the path information is used to record a transmission path of the message such that a path discovery process can be implemented during service discovery. Therefore, the method for service discovery in this embodiment of the present disclosure can implement the path discovery process during service discovery, that is, the service discovery process and the path discovery process are implemented in one process in order to reduce numerous air interface messages and save numerous time-frequency resources.

With reference to the first aspect, in a first implementation of the first aspect, sending, by the first device, a second service discovery message includes, if the first device is not located in any NAN data cluster (NDC) in the NAN, sending, by the first device, the second service discovery message in a DW of the NAN, if the first device is located in a first NDC, sending, by the first device, the second service discovery message in the first NDC, or if the first device is located in at least two NDCs, sending, by the first device, the second service discovery message in at least one of the at least two NDCs.

In this implementation, if the first device is not located in any NDC, because all devices in the NAN are awake in the DW window, the first device may send the second service discovery message in the DW window such that more devices detect the second service discovery message, if the first device is located in the first NDC, all devices in the first NDC may detect the message sent by the first device, and the first device may select to broadcast the second service discovery message in the first NDC, or if the first device is located in the at least two NDCs, the first device may broadcast the second service discovery message in one or more NDCs in the at least two NDCs.

With reference to the first aspect, in a second implementation of the first aspect, the method further includes receiving, by the first device, a first response message sent by a third device, where the first response message indicates that the third device is a service responding device for the service initiating device, the first response message carries third path information, and the third path information includes the identifier information of the service initiating device and identifier information of the third device, determining, by the first device, fourth path information according to the third path information, where the fourth path information includes the identifier information of the service initiating device, the identifier information of the first device, and the identifier information of the third device, and sending, by the first device, a second response message, where the second response message carries the fourth path information.

In this implementation, the third device is the service responding device, that is, a device that receives the second service discovery message sent by the first device, after receiving the second service discovery message, the third device determines, according to the service identifier information carried in the message, that the third device is the service responding device for the service initiating device, and may send the first response message to the first device, where the first response message carries the third path information, and the first device may determine the fourth path information according to the third path information, and then transfer the fourth path information by sending the second response message, until the first response message is forwarded to the service initiating device, where the second response message is the first response message that is forwarded.

With reference to the first aspect and the foregoing implementation of the first aspect, in a third implementation of the first aspect, sending, by the first device, a second response message includes sending, by the first device, the second response message to the second device, if the first device is located in the first NDC, broadcasting, by the first device, the second response message in the first NDC, or if the first device is located in the at least two NDCs, broadcasting, by the first device, the second response message in the at least one of the at least two NDCs.

In this implementation, the first device may forward the first response message of the service responding device to the service initiating device by sending the second response message to the second device in unicast mode, or may broadcast, in a broadcast form, the second response message in an NDC in which the first device is located such that devices located in different NDCs in the NDC in which the first device is located can forward the second response message, and therefore, an NDC-based transmission path between the service initiating device and the service responding device may be established.

Optionally, if the third device has broadcast the first response message in one or more NDCs, the first device may select not to send the second response message in the NDC in which the first response message has been broadcast, but select to broadcast the second response message in another NDC, thereby saving air interface resources to some extent.

With reference to the first aspect and the foregoing implementation of the first aspect, in a fourth implementation of the first aspect, a fourth device is a device that forwards the first response message, the first device is located in the first NDC, the fourth device is located in a second NDC, and before sending, by the first device, a second response message, the method further includes receiving, by the first device, a third response message that the fourth device broadcasts in the second NDC, where the third response message is the first response message that is forwarded, and if the first NDC and the second NDC are different NDCs, broadcasting, by the first device, the second response message in the first NDC, or if the first NDC and the second NDC are the same NDC, skipping, by the first device, broadcasting the second response message in the first NDC.

In this implementation, after the third device sends the response message, not only the first device may forward the response message, but also the fourth device may forward the response message. In this case, if the fourth device has forwarded the response message before the first device forwards the response message, the first device may determine whether NDCs in which the first device and the fourth device are located are the same, if the NDCs are not the same, the first device may select to broadcast the second response message in an NDC in which the fourth device has not broadcast the second response message, if the NDCs are the same, it indicates that in the NDC in which the first device is located, a device has broadcast the response message, and in this case, other devices in the NDC may not perform forwarding, thereby saving air interface resources.

With reference to the first aspect and the foregoing implementation of the first aspect, in a fifth implementation of the first aspect, the second path information further includes a first metric, the first metric is used to measure quality of a path between the first device and the second device, and the first metric is represented by at least one of the following parameters an intersection of a wake-up time of the first device and a wake-up time of the second device, an intersection of a base schedule of an NDC in which the first device is located and a base schedule of an NDC in which the second device is located, duration of a base schedule of an NDC in which the first device is located, a master preference (MP) of the first device, and a master rank (MR) of the first device, or role information of the first device in the NAN.

In this implementation, the second path information may further include the first metric, that is, the second path information may not only include the identifier information of the service initiating device and the identifier information of the first device, but also include first metric information of the path between the first device and the second device. In other words, the second path information may not only record the transmission path of the message, but also carry path metric information used for measuring the quality of the path. Therefore, in the method for service discovery in this embodiment of the present disclosure, not only a transmission path may be discovered during service discovery, but also a path with better performance may be determined according to the metric used for measuring the quality of the path.

With reference to the first aspect and the foregoing implementation of the first aspect, in a sixth implementation of the first aspect, the second path information further includes the first metric, the first metric is used to measure the quality of the path between the first device and the second device, and before sending, by the first device, a second service discovery message, the method further includes receiving, by the first device, a third service discovery message from a fifth device, where the third service discovery message carries the service identifier information and fifth path information, the fifth path information includes the identifier information of the service initiating device, identifier information of the fifth device, and a second metric, and the second metric is used to measure quality of a path between the first device and the fifth device, determining, by the first device according to the first metric and the second metric, that the path between the first device and the second device is better than the path between the first device and the fifth device, and forwarding, by the first device, the first service discovery message, and skipping forwarding the third service discovery message.

In this implementation, if the first device may receive forwarded messages of the service discovery messages of the second device and the fifth device, the first device may determine, according to metrics included in the two forwarded messages, which device has a better path to the first device, and therefore may select a forwarded message sent by a device with a better forwarding path.

With reference to the first aspect and the foregoing implementation of the first aspect, in a seventh implementation of the first aspect, the first metric is represented by the intersection of the wake-up time of the second device and the wake-up time of the first device, and the second metric is represented by an intersection of a wake-up time of the fifth device and the wake-up time of the first device. The determining, by the first device according to the first metric and the second metric, that the path between the first device and the second device is better than the path between the first device and the fifth device, includes, if the intersection of the wake-up time of the second device and the wake-up time of the first device is longer than the intersection of the wake-up time of the fifth device and the wake-up time of the first device, and the first metric is greater than the second metric, when the first metric is greater than the second metric, determining, by the first device, that the path between the first device and the second device is better than the path between the first device and the fifth device, or if the intersection of the wake-up time of the second device and the wake-up time of the first device is longer than the intersection of the wake-up time of the fifth device and the wake-up time of the first device, and the first metric is less than the second metric, when the first metric is less than the second metric, determining, by the first device, that the path between the first device and the second device is better than the path between the first device and the fifth device.

In this implementation, the first metric may be represented by the intersection of the wake-up time of the first device and the wake-up time of the second device. If the intersection of the wake-up times is longer, it indicates that the devices may have longer times for data transmission, and the path is better. Optionally, it may be specified that, if the wake-up times are longer, the metric is greater or smaller, that is, the wake-up times may be directly proportional or inversely proportional to the metric. In this case, when the intersection of the wake-up times is directly proportional to the metric, the first device may determine that a path with a greater metric is better, or when the intersection of the wake-up times is inversely proportional to the metric, the first device determines that a path with a smaller metric is better.

With reference to the first aspect and the foregoing implementation of the first aspect, in an eighth implementation of the first aspect, the first service discovery message further carries at least one of the following information such that the first device computes the first metric between the first device and the second device, where the first metric is used to measure the quality of the path between the first device and the second device sleep regularity of the second device, a sleep time of the second device, work regularity of the second device, or a work time of the second device.

In this implementation, if no communication is performed between the first device and the second device, the first device may not know the foregoing information of the second device. Optionally, in this case, the first service discovery message may carry one or more of the foregoing information such that the first device computes the first metric between the first device and the second device, where the first metric may measure the quality of the path between the first device and the second device.

With reference to the first aspect and the foregoing implementation of the first aspect, in a ninth implementation of the first aspect, the first service discovery message further carries change information in the NAN, and the method further includes determining that the first device is a service responding device for the service initiating device when the service identifier information matches a first service identifier, where the service identifier information is generated by the service initiating device according to service information of the service initiating device, or generated by the service initiating device according to the change information in the NAN and service information of the service initiating device, the first service identifier is generated by the first device according to service information of the first device, or generated by the first device according to the change information in the NAN and service information of the first device, and the service information of the service initiating device indicates information about the service supported by the service initiating device or information about the service queried by the service initiating device, if the service information of the service initiating device is the information about the service supported by the service initiating device, the service information of the first device is the information about the service queried by the first device, or if the service information of the service initiating device is the information about the service queried by the service initiating device, the service information of the first device is the information about the service supported by the first device, and the change information in the NAN includes at least one of the following information of an anchor master rank (AMR), an MR, an MP, an anchor master preference (AMP), a random factor (RF), an anchor master beacon transmission time (AMBTT), a time synchronization function (TSF) value, a cluster identifier, a cluster grade (CG), or a group key.

In this implementation, the service identifier information may be generated by the service initiating device according to the service information of the service initiating device, or generated by the service initiating device according to the change information in the NAN and the service information of the service initiating device, the first device may generate the first service identifier according to the service information of the first device, or generate the first service identifier according to the service information of the first device in combination with the change information in the NAN, then the first device may determine, by comparing the first service identifier with the service identifier information of the service initiating device, whether the first device is the service responding device for the service initiating device. Because the service identifier information is generated according to the service information in combination with the change information, but the change information changes dynamically, it may be ensured that the service identifier changes dynamically, thereby preventing an eavesdropper from tracking.

With reference to the first aspect and the foregoing implementation of the first aspect, in a tenth implementation of the first aspect, the first service discovery message further carries identifier change regularity information of the service initiating device, and the identifier change regularity information indicates change regularity of the identifier information of the service initiating device such that after the identifier information of the service initiating device changes, a device that receives the first service discovery message identifies the service initiating device according to the identifier change regularity information or updates the identifier information of the service initiating device according to the identifier change regularity information.

In this implementation, the first service discovery message may further carry the identifier change regularity information of the service initiating device such that after the identifier information of the service initiating device changes, the device that receives the service discovery message identifies the service initiating device according to the identifier change regularity information or updates the service information of the service initiating device according to the identifier change regularity information. Because the service information also changes, security and privacy of the service discovery process are enhanced.

Optionally, the service discovery message may further carry service identifier change regularity information of the service initiating device, and the service identifier change regularity information indicates change regularity of the service identifier information of the service initiating device such that after the service identifier information of the service initiating device changes, a device that receives the service discovery message identifies a service identifier of the service initiating device according to the identifier change regularity information or updates the service identifier information of the service initiating device according to the identifier change regularity information.

With reference to the first aspect and the foregoing implementation of the first aspect, in an eleventh implementation of the first aspect, before the sending, by the first device, a second service discovery message, the method further includes sending, by the first device, the second service discovery message when the first device has a forwarding capability, or skipping, by the first device, sending the second service discovery message when the first device has no forwarding capability.

In this implementation, after receiving the first service discovery message, the first device may determine, according to whether the first device has the forwarding capability, whether to forward the first service discovery message, and when the first device has the forwarding capability, the first device sends the second service discovery message.

With reference to the first aspect and the foregoing implementation of the first aspect, in a twelfth implementation of the first aspect, a message format of the service discovery message is one of the following, a service discovery frame (SDF) message format, an action frame message format, a beacon frame message format, or a user-defined message format.

In this implementation, the service discovery message may be a subscribe message or a broadcast (or publish) message in an SDF message, or a new frame defined in an action frame format may be used, or another existing frame format may be used, or a user-defined frame format or the like may be used.

With reference to the first aspect and the foregoing implementation of the first aspect, in a thirteenth implementation of the first aspect, the service discovery message further carries multi-hop indication information, where the multi-hop indication information is used to discover a service responding device within a multi-hop range.

In this implementation, the service discovery message may include the multi-hop indication information, and the multi-hop indication information may be used to indicate one-hop or multi-hop service discovery. That is, this embodiment of the present disclosure may not only implement multi-hop service discovery but also implement one-hop service discovery. Therefore, discovery of a one-hop or multi-hop path may be implemented in a one-hop or multi-hop service discovery process.

According to a second aspect, a method for service discovery in a NAN is provided, where the method includes receiving, by a first device, a first service discovery message from a second device, where the first service discovery message carries service identifier information and first path information, the service identifier information indicates a service queried by a service initiating device or a service supported by the service initiating device, and the second device is the service initiating device or a service forwarding device, determining, by the first device according to the service identifier information, that the first device is a service responding device for the service initiating device, and sending, by the first device, a response message, where the response information carries second path information, and the second path information includes identifier information of the service initiating device and identifier information of the first device, or identifier information of the service initiating device, identifier information of the second device, and identifier information of the first device.

In this implementation, the first device is the service responding device for the service initiating device, and the second device may be the service initiating device or the service forwarding device, after receiving the first service discovery message, the first device may determine, according to the service identifier information in the first service discovery message, that the first device is the service responding device for the service initiating device, that is, the first device is a device that can provide the service queried by the service initiating device, or a device that requires the service supported by the service initiating device, and therefore can return the response message, where the response message carries path information including the identifier information of the first device.

With reference to the second aspect, in a first implementation of the second aspect, sending, by the first device, a response message includes sending, by the first device, the response information to the second device, if the first device is located in a first NDC, broadcasting, by the first device, the response message in the first NDC, or if the first device is located in at least two NDCs, broadcasting, by the first device, the response message in at least one of the at least two NDCs, or if the first device is not located in any NDC in the NAN, joining, by the first device, a second NDC in the NAN, and broadcasting the response message in the second NDC.

In this implementation, the first device may transmit the response message along a path in a reverse direction according to the path information, that is, return the response message to a forwarding device from which the service discovery message is received, after service matching is successful, the first device may further broadcast the response message in the NDC in which the first device is located, or if the first device is not located in any NDC, the first device may select to join an NDC, and then broadcast the response message in the NDC, and forwarding devices in another NDC may broadcast the response message in the other NDC after receiving the response message. In this way, the response message is transmitted hop by hop, until it arrives at the service initiating device, and therefore, an NDC-based transmission path between the service responding device and the service initiating device may be established.

With reference to the second aspect and the foregoing implementation of the second aspect, in a second implementation of the second aspect, determining, by the first device according to the service identifier information, that the first device is a service responding device for the service initiating device, includes determining, by the first device, that the first device is the service responding device for the service initiating device when the service identifier information matches a first service identifier of the first device, where the service identifier information is generated by the service initiating device according to service information of the service initiating device, or generated by the service initiating device according to change information in the NAN and service information of the service initiating device, the first service identifier is generated by the first device according to service information of the first device, or generated by the first device according to the change information in the NAN and service information of the first device, and the service information of the service initiating device indicates information about the service supported by the service initiating device or information about the service queried by the service initiating device, if the service information of the service initiating device is the information about the service supported by the service initiating device, the service information of the first device is the information about the service queried by the first device, or if the service information of the service initiating device is the information about the service queried by the service initiating device, the service information of the first device is the information about the service supported by the first device, and the change information in the NAN includes at least one of the following information of an AMR, an MR, an MP, an AMP, an RF, an AMBTT, a TSF value, a cluster identifier, a CG, or a group key.

In this implementation, the service identifier information may be generated by the service initiating device according to the service information of the service initiating device, or generated by the service initiating device according to the change information in the NAN and the service information of the service initiating device, the first device may generate the first service identifier according to the service information of the first device, or generate the first service identifier according to the service information of the first device in combination with the change information in the NAN, then the first device may determine, by comparing the first service identifier with the service identifier information of the service initiating device, whether the first device is the service responding device for the service initiating device. Because the service identifier information is generated according to the service information in combination with the change information, but the change information changes dynamically, it may be ensured that the service identifier changes dynamically, thereby preventing an eavesdropper from tracking. Therefore, security of the service discovery process is ensured.

With reference to the second aspect and the foregoing implementation of the second aspect, in a third implementation of the second aspect, the method further includes forwarding, by the first device, the first service discovery message, or determining, according to diffusion indication information carried in the first service discovery message, whether to forward the first service discovery message, where the diffusion indication information indicates whether to forward the forwarded message when the first device is the service responding device for the service initiating device.

In this implementation, the first device may continue to forward the first service discovery message after service matching is successful in order to query more service responding devices, or may determine, according to the diffusion indication information carried in the first service discovery message, whether to forward the first service discovery message.

With reference to the second aspect and the foregoing implementation of the second aspect, in a fourth implementation of the second aspect, the response message includes hop count information and a first metric, the hop count information is determined according to a quantity of times that the service discovery message is forwarded during transmission from the service initiating device to the service responding device, and the first metric is used to measure quality of a path between the first device and the service responding device.

In this implementation, the response message may further include the hop count information and first metric information, the hop count information may be used to determine a maximum transmission distance between the service initiating device and the service responding device, and the first metric may be used by the service responding device to select an optimal return path.

According to a third aspect, a terminal device is provided and configured to perform the method in any one of the first aspect or the implementations of the first aspect.

Further, the terminal device may include units configured to perform the method in any one of the first aspect or the implementations of the first aspect.

According to a fourth aspect, a terminal device is provided and configured to perform the method in any one of the second aspect or the implementations of the second aspect.

Further, the terminal device may include units configured to perform the method in any one of the second aspect or the implementations of the second aspect.

According to a fifth aspect, a terminal device is provided, where the terminal device includes a transceiver, a memory, a processor, and a bus system. The transceiver, the memory, and the processor are connected by the bus system, the memory is configured to store an instruction, the processor is configured to execute the instruction stored in the memory in order to control the transceiver to receive or transmit a signal, and when the processor executes the instruction stored in the memory, the execution causes the processor to perform the method in any one of the first aspect or the implementations of the first aspect.

According to a sixth aspect, a terminal device is provided, where the terminal device includes a transceiver, a memory, a processor, and a bus system. The transceiver, the memory, and the processor are connected by the bus system, the memory is configured to store an instruction, the processor is configured to execute the instruction stored in the memory in order to control the transceiver to receive or transmit a signal, and when the processor executes the instruction stored in the memory, the execution causes the processor to perform the method in any one of the second aspect or the implementations of the second aspect.

Based on the foregoing technical solutions, the method for service discovery in a NAN and the terminal device in the embodiments of the present disclosure can implement a path discovery process in a service discovery process in order to reduce numerous air interface messages and save numerous time-frequency resources.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as a Global System for Mobile Communications (GSM), a Code Division Multiple Access (CDMA) system, a Wideband CDMA (WCDMA), a general packet radio service (GPRS), a Long Term Evolution (LTE), and a NAN system.

User equipment, also referred to as a mobile terminal, a mobile device, mobile user equipment, and the like, may communicate with one or more core networks by using a radio access network (for example, Radio Access Network (RAN)). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus.

Figure 1:
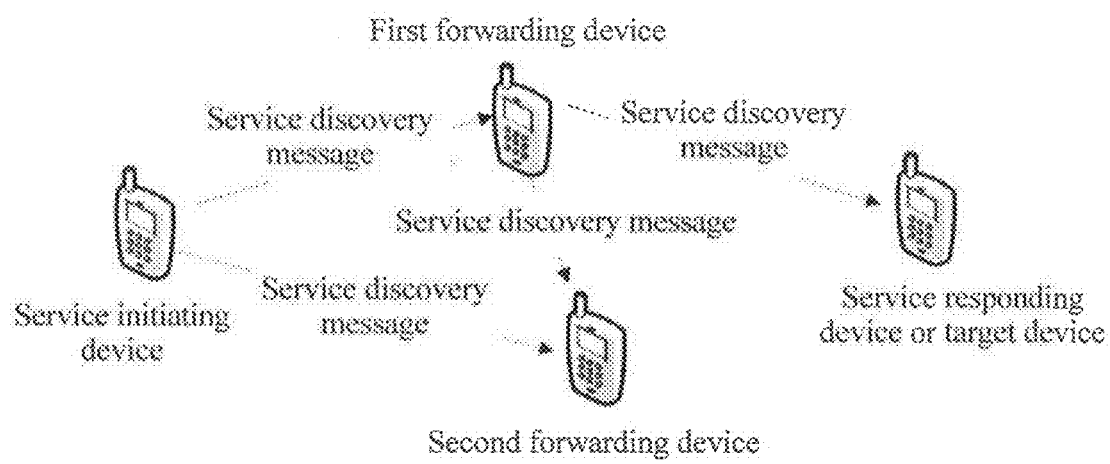
FIG. 1 is a schematic diagram of an application scenario according to an embodiment of the present disclosure.

FIG. 1 shows a schematic diagram of an application scenario according to an embodiment of the present disclosure. As shown in FIG. 1, a service initiating device is a device that sends a service discovery message, where the service discovery message is used to discover a service responding device (which may also be referred to as a target device) beyond a wireless transmission distance, and the service responding device is a device that can provide a service required by the service initiating device, or a device that requires a service supported by the service initiating device, and a service forwarding device is a device that forwards the service discovery message sent by the service initiating device. In the application scenario of FIG. 1, the service forwarding device includes a first forwarding device and a second forwarding device, and may include more service forwarding devices in an actual application. The message forwarded by the service forwarding device is the service discovery message sent by the service initiating device, or is a forwarded message of a service discovery message sent by another service forwarding device.

It should be understood that, this embodiment of the present disclosure is described by using only a two-hop application scenario as an example. However, this embodiment of the present disclosure is not limited to this. The system may further include more service forwarding devices. A path between the service initiating device and the service responding device may be three hops or more hops or the like. That a hop count from the service initiating device to the service responding device is n may be understood to be that the service discovery message sent by the service initiating device can arrive at the service responding device only after being forwarded by n−1 service forwarding devices. For example, one service forwarding device exists between the service initiating device and the service responding device, and the service discovery message may arrive at the service responding device after being forwarded once. In this case, the hop count from the service initiating device to the service responding device is 2.

It should also be understood that, that a device A is a previous-hop device of a device B means that, on a transmission path from the service initiating device to the service responding device, the device B is a device receiving a message sent by the device A, and that a device C is a next-hop device of the device B means that, on a transmission path from the service initiating device to the service responding device, the device C is a device receiving a message sent by the device B.

Figure 2:
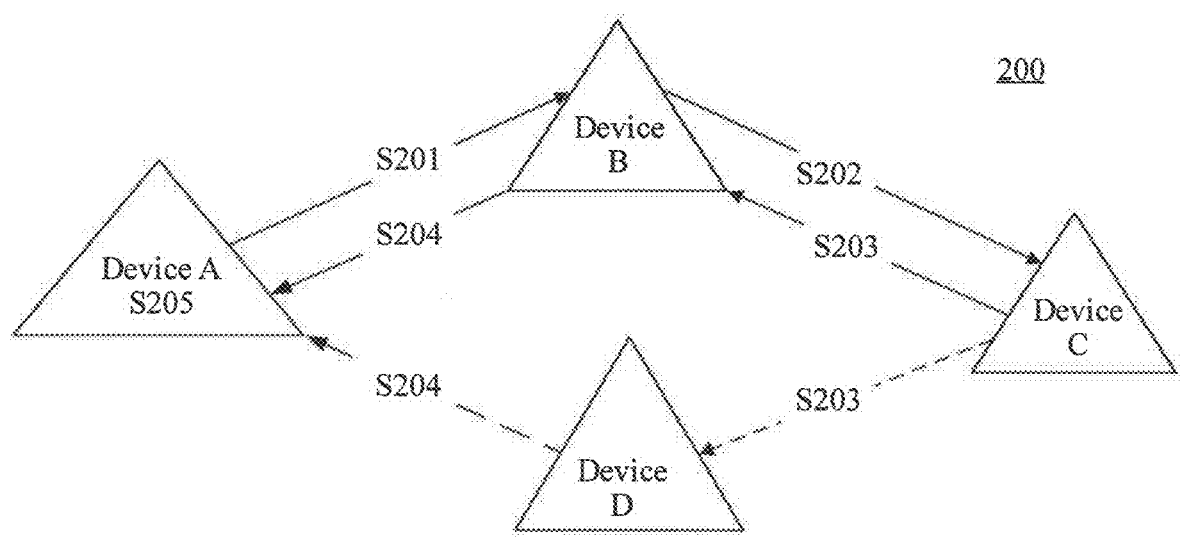
FIG. 2 is a schematic flowchart of a method for service discovery in a NAN according to an embodiment of the present disclosure.

With reference to the two-hop application scenario shown in FIG. 1, the following describes in detail how to complete a path discovery process between a service initiating device and a service responding device in a service discovery process. FIG. 2 shows a specific flowchart of a method 200 for service discovery in a NAN according to an embodiment of the present disclosure. The method is described from a perspective of device interaction. In FIG. 2, a device A is a service initiating device, a device B and a device D are service forwarding devices, and a device C is a service responding device.

In step S201, the device A sends a service discovery message.

Further, the device A serves as a service initiating device, and wants to initiate service discovery to a device within a one-hop or multi-hop range. The device A may send a service discovery message, where the service discovery message carries service identifier information, and the service identifier information indicates a service queried by the service initiating device or a service supported by the service initiating device. Optionally, the service discovery message may be a service query message or a service broadcast message. If the service discovery message is a service query message, the service query message is used to discover a device that can provide the service queried by the service initiating device. In this case, the service identifier information may indicate the service that the device A needs to discover. If the service discovery message is a service broadcast message, the service broadcast message may be used to broadcast the service supported by the service initiating device. In this case, the service identifier information indicates the service supported by the device A.

For example, the service identifier information may be a service identifier (also referred as SID) or in a bitmap form. The service identifier information may be generated by the service initiating device according to service information of the service initiating device, or generated by the service initiating device according to service information in combination with change information in the NAN. Optionally, the change information in the NAN may include at least one of the following information of an AMR, an MR, an MP, an AMP, an RF, an AMBTT, a TSF value, a cluster identifier, a CG, or an interface address. The change information in the NAN may also be a part or all of some information above. The service information may be a service name, a hash value of a service name, a service number, or the like. This is not limited in this embodiment of the present disclosure.

Further, the service identifier information may be a mapping that is generated after an operation (for example, a hash operation) is performed on the service information and one or more of the change information, and then is determined as the service identifier information of the device A.

For example, the service identifier information may be obtained after a hash operation is performed according to the service information and the TSF value, or obtained after a hash operation is performed according to the service information and some information of the TSF value, or obtained after a hash operation is performed according to a hash value of the service information and the TSF value, obtained after a hash operation is performed according to a hash value of the service information and some information of the TSF value, obtained after a hash operation is performed according to the service information and the TSF value and the AMR, obtained after a hash operation is performed according to the service information and some information of the TSF value and some information of the AMR, obtained after a hash operation is performed according to some information of a hash value of the service information and some information of the TSF value and some information of the AMR, obtained after a hash operation is performed according to some information of a hash value of the service information and some information of the TSF value, or the like.

Optionally, the service identifier information may also be indicated in the bitmap form. The device A may generate the service identifier information according to different service information, and the process of generating the service identifier information may be mapping different service information through computation (for example, using a hash operation) to different bits in a bitmap, that is, different bits indicate different service identifiers. Further, the bitmap may be a Bloom filter bitmap.

Optionally, the first service discovery message may further carry identifier change regularity information of the service initiating device such that after identifier information of the service initiating device changes, a device that receives the service discovery message identifies the service initiating device according to the identifier change regularity information or updates the identifier information of the service initiating device according to the identifier change regularity information.

Optionally, the first service discovery message may further carry service identifier change regularity information of the service initiating device such that after the service identifier information of the service initiating device changes, the device that receives the service discovery message identifies the service initiating device according to the service identifier change regularity information or updates the service identifier information of the service initiating device according to the identifier change regularity information.

Optionally, the service discovery message may further carry multi-hop indication information, where the multi-hop indication information indicates that the service initiating device needs to discover a service responding device within a multi-hop range, and "multi-hop" means that the service discovery message can arrive at the service responding device only after being forwarded by service forwarding devices.

Optionally, the service discovery message may indicate, by adding a related attribute used for discovering a multi-hop service to an existing message frame, for example, an SDF, an action frame, or a beacon frame, that the service discovery message is used to discover a service responding device within a multi-hop range, or may use a user-defined message format, or the like. This is not limited in this embodiment of the present disclosure.

Optionally, the service discovery message may further include path information. For example, the path information may include the identifier information of the service initiating device, namely, the device A. Optionally, the identifier information may be identifier information used for distinguishing the device, such as media access control (MAC) address information, or interface address information. This is not limited in this embodiment of the present disclosure.

Optionally, the path information may be carried in a MAC header of the service discovery message. For example, the identifier information of the device in the path information may be address information in the MAC header. Further, the identifier information of the service initiating device may be a source address (SA). For example, the address information of the service discovery message may be set in the following manner. The SA of the service discovery message may be set to a MAC address of the service initiating device, namely, the device A, a receive address (RA) may be set to a broadcast address of the device A, for example, a WI-FI address, and a transmit address (TA) may be set to an address of the device A. Because no service responding device is found in this case, a destination address (DA) may be null. It should be noted that, the path information may also be carried in the service discovery message in another manner. The manner of carrying the path information in the service discovery message is not limited in this embodiment of the present disclosure.

Optionally, the path information may further include metric information, where the metric may be used to measure quality of a path. The metric information may be used by a next-hop device of the device A, namely, the device that receives the service discovery message, to discover an optimal path according to the metric information.

With reference to specific examples, the following describes in detail which parameters may be used to represent the metric.

For example, a wake-up time of the device may be used to represent the metric. For example, a metric between a device X and a device Y may be measured by an intersection of wake-up times of the device X and the device Y. For example, in the NAN network, a channel 6 is used as a discovery channel, and a DW is set within every 512 time units (TU) (about 1024 micro seconds (µs)) on the channel, where duration of the DW is 16 TUs. In units of 512 TUs, duration of wake-up of both the device X and the device Y within the 512 TUs may be used to measure the metric between the device X and the device Y. For example, within the 512 TUs, wake-up times of both the device X and the device Y are 30 TUs, and wake-up times of both the device X and a device Z are 20 TUs. Optionally, it may be specified that, if the wake-up times are longer, the metric is greater, and the path is better. If a metric corresponding to the 30 TUs is 3, and a metric corresponding to the 20 TUs is 2, through comparison, it may be determined that a path between the device X and the device Y is better than a path between the device X and the device Z, or the wake-up times may be set to be inversely proportional to the metric, that is, if the wake-up times are longer, the metric is smaller, and a path with the smaller metric is better. Alternatively, sleep times of the device X and the device Y within the 512 TUs may be used to measure the metric. For example, it may be specified that, if the sleep times are shorter, the metric is greater, and the path between the devices is better, or it may be specified that, if the sleep times are shorter, the metric is smaller, and the path between the devices is better. This is not limited in this embodiment of the present disclosure.

Alternatively, an intersection of base schedules of NDCs in which devices are located may be used to represent the metric between the two devices. For example, it may be specified that, if the intersection is greater, the metric is greater, and the path between the devices is better. If the metric from the device X to the device Y is 3, and the metric from the device X to the device Z is 2, through comparison, it may be determined that the path between the device X and the device Y is better than the path between the device X and the device Z. Alternatively, it may be specified that, if the intersection is greater, the metric is smaller, and the path between the devices with the smaller metric is better.

Alternatively, an MP of a device may be used to represent the metric. For example, it may be specified that, if the MP of the device is greater, the metric is greater, and the path is better. In this case, if the metric from the device Z to the device Y is greater than the metric from the device X to the device Y, it may be determined that the path from the device Z to the device Y is better than the path from the device X to the device Y. Therefore, the device Y may select to forward a service discovery message sent by the device Z, instead of forwarding a service discovery message sent by the device X. Therefore, air interface resources may be saved. Likewise, it may also be specified that, if the MP of the device is greater and the metric is smaller, it indicates that a path between the device and a next-hop device is better.

Alternatively, a rank of a device may be used to represent the metric. The rank of the device is used to measure a preference of the device for making a base schedule. A greater preference indicates a greater preference for making the base schedule, and the rank of the device is higher. It may be specified that, if the rank of the device is higher, the metric is greater, and the path between the device and the next-hop device is better. In this case, if the metric from the device X to the device Y is 3, and the metric from the device X to the device Z is 2, it may be determined that the path from the device X to the device Y is better than the path from the device X to the device Z. Likewise, it may be specified that, if the rank is higher, the metric is smaller, and a path with the smaller metric is better.

Alternatively, duration of the base schedule of the NDC in which the device is located may be used to represent the metric message. For example, it may be specified that, if the duration of the base schedule of the NDC in which the device is located is longer, the metric is greater. For example, duration of a base schedule of an NDC in which the device Y is located is longer than duration of a base schedule of an NDC in which the device Z is located, the metric from the device X to the device Y is 3, and the metric from the device X to the device Z is 2. In this case, by comparison, the path from the device X to the device Y is better than the path from the device X to the device Z. Likewise, it may be specified that, if the duration of the base schedule of the NDC in which the device is located is longer, the metric is smaller, and a path with the smaller metric is better.

Alternatively, role information of the device may be used to represent the metric message.

The role information of the device may be an anchor master (AM), a master, a synchronization non master (sync non master), a non synchronization non master (non sync non master), a proxy server, or a proxy client, and may be used as the metric according to priorities of one or more of the foregoing role information. It may be specified that, if a priority of a role of a device is higher, the metric is greater, and a path with the greater metric is better. For example, a role of the device Y is an anchor master, a role of the device Z is a non sync non master, the metric from the device X to the device Y is 3, and the metric from the device X to the device Z is 2. In this case, it may be determined that the path from the device X to the device Y is better than the path from the device X to the device Z. Likewise, it may be specified that, if a priority of a role of a device is higher, the metric is smaller, and a path with the smaller metric is better.

Optionally, the service discovery message may further carry at least one of the following information of sleep regularity of the device A, a sleep time of the device A, work regularity of the device A, or a work time of the device A such that the device that receives the service discovery message computes a first metric between the device A and the receiving device.

The following uses the work time of the device A as a specific embodiment to describe in detail how the device B computes the first metric between the device A and the device B according to the work time of the device A.

For example, the first metric may be indicated in the bitmap form, a first dimension of the bitmap is time information, 16 TUs are used as a minimum time unit of the device working on a channel, and within every 16 TUs, the device is in a sleep state or works on a channel. A second dimension of the bitmap is channel information, namely, information about a channel on which the device can work. A unit corresponding to a minimum time unit and a channel may be set as a metric unit. Setting a unit corresponding to a channel and a minimum time unit to 1 may indicate that the device works on the channel in a time period indicated by the minimum time unit, and setting a unit corresponding to a channel and a minimum time unit to 0 or to null indicates that the device enters the sleep state in a time period indicated by the minimum time unit. The device A sends information about the work time of the device A to the device B, and the device B may set a corresponding unit in the bitmap to 1 according to the information about the work time of the device A, then set a corresponding unit in the bitmap to 1 according to the information about the work time of the device B, and determine the first metric by matching the unit that is set to 1 in the bitmap by the device A with the unit that is set to 1 in the bitmap by the device B.

It should be understood that, the first metric information may be computed in other manners. For example, a match percentage of metric units of the device A and the device B in the bitmap may be used as the first metric. For example, a quantity of metric units of the device A is 32, and 16 of the 32 metric units may be used by the device B to transmit data. In this case, a match percentage of the metric units is 50%, and it may be determined that the first metric is 50%. Alternatively, a range of a match degree in the bitmap may be quantized, and a range of a match degree may correspond to a preset first metric. For example, when a range of a match degree is 10%-20%, the corresponding first metric may be M, or when a range of a match degree is 80%-90%, the corresponding first metric may be N, where M<N. In this case, when a match degree of the metric units of the device A and the device B is determined as 85%, the corresponding first metric may be determined as N. Optionally, the first metric may also be a determined numeric value or a rank, for example, may be represented by a letter or a symbol, or may be indicated by a range. This is not limited in this embodiment of the present disclosure.

Optionally, the service discovery message may be sent in broadcast or multicast mode, or sent in unicast mode. This is not limited in this embodiment of the present disclosure.

It should be understood that, the service discovery message may be broadcast in a DW, or may be broadcast in other time periods, or may be broadcast in the NDC in which the device A is located, or may be further broadcast in the base schedule of the NDC in which the device A is located, or the like. This is not limited in this embodiment of the present disclosure.

It should also be understood that, the service discovery message may further include diffusion indication information, where the diffusion indication information is used to indicate, after a service responding device meeting a condition is discovered, whether the service responding device continues to forward the service discovery message. If the service discovery message needs to discover only one service responding device meeting the condition, the diffusion indication information may indicate that the service responding device does not diffuse the service discovery message after receiving the service discovery message, or else, continues to forward the service discovery message to discover more service responding devices.

In step S202, the device B forwards the service discovery message.

Optionally, after the device B receives the service discovery message sent by the device A, when the device B determines that the device B is a device having a forwarding capability, for example, a proxy device, a master device, a non master sync device, or a device located in the NDC, the device B forwards the service discovery message, or else does not forward the service discovery message.

Optionally, the device B may further determine, according to a sequence number carried in the received service discovery message, whether to forward the service discovery message, where the sequence number indicates a sequence of services that need to be discovered by the service initiating device. If the service initiating device initiates a new service discovery message, the sequence number is updated. For example, 1 may be added to the sequence number. If the sequence number in the service discovery message received by the device B is less than or equal to a sequence number in a previously received service discovery message, the device B may determine that the service discovery message is not a latest service discovery message, and may select not to forward the service discovery message.

After determining to forward the service discovery message, the device B may further obtain the service information and path information according to the service discovery message, and then may add the service identifier information and updated path information to the message when forwarding the service discovery message.

Further, the device B may obtain, according to the service identifier information carried in the service discovery message, the service information queried or supported by the service initiating device, namely, the device A. Optionally, the device B may return a response message to the device A when determining, according to the service identifier information, that the device B meets the service information queried by the device A, or when determining that the service information supported by the device A is service information required by the device B, where the response message may carry the service identifier information, or may carry identifier information of the device B, for example, MAC address information. Alternatively, when the device B determines, by matching the service identifier information, that the device B is not a service responding device for the service initiating device, if the device B knows that the device X is a service responding device that the service initiating device needs to discover, the device B may send the service discovery message to the device X in unicast mode.

Optionally, the device B may further obtain the path information according to the service discovery message, where the path information includes the identifier information of the service initiating device, namely, the device A, for example, MAC address information or interface address information. Optionally, the identifier information of the device A may be carried in the address information in the MAC header of the service discovery message. For example, the MAC address information of the device A may be obtained from SA information in the address information in the MAC header of the service discovery message.

Optionally, if the device B receives a forwarded message of the service discovery message, that is, a device that sends the forwarded message is another service forwarding device, the path information may further include identifier information of the service forwarding device, where the identifier information may also be MAC address information of the service forwarding device. Optionally, the identifier information may also be carried in the address information in the MAC header of the service discovery message, and the device B may obtain the MAC address information of the service forwarding device from TA information in the address information in the MAC header of the service discovery message.

If the device B determines to forward the service discovery message, the device B may diffuse the service discovery message in broadcast or unicast mode. For example, if the device B is a master device or a non master sync device, the device B may select to broadcast the service discovery message in the DW, or if the device B is a proxy device or a relay device, the device B may select to broadcast the service discovery message in the DW, or if the device B is a device in an NDC, the device B may broadcast the service discovery message in the NDC, or may select to broadcast the service discovery message in a base schedule of the NDC, or if the device B is located in multiple different NDCs, the device B may select to broadcast the service discovery message in the multiple different NDCs, or may broadcast the service discovery message in base schedules of the multiple different NDCs, or the like. This is not limited in this embodiment of the present disclosure.

Optionally, before forwarding the service discovery message, the device B updates path information of the forwarded message of the service discovery message. In this case, the path information of the forwarded message may not only include the identifier information of the service initiating device, namely, the device A, but also include the identifier information of the device B. The identifier information may be MAC address information of the device, and the identifier information of the device may be carried in a MAC header of the forwarded message of the service discovery message. For example, the address information of the forwarded message may be set in the following manner. An SA may be set to the MAC address of the service initiating device, namely, the device A, an RA may be set to the broadcast address of the device A, for example, a WI-FI address, and a TA is an address of the device B. Because no service responding device is found in this case, a DA may be null. Optionally, the path information may further include a metric from the device A to the device B, where the metric is used to measure quality of a path between the device A and the device B. Likewise, the metric may be represented in any metric manner described in step S201. Details are not described again herein to avoid repetition.

Optionally, if the previous-hop device of the device B is another service forwarding device between the service initiating device and the service responding device, the device may further receive multiple forwarded messages, where path information of each of the multiple forwarded messages carries a metric. The device B may determine, according to multiple metrics, which metric indicates a better path, and therefore may select to forward a forwarded message that carries the metric and is sent by a device. For example, the device B receives forwarded messages of a device M and a device N. According to metrics carried in the two forwarded messages, the device B determines that a path from the device M to the device B is better than a path from the device N to the device B. In this case, the device B may select to forward a forwarded message sent by the device M, instead of forwarding a forwarded message sent by the device N, thereby avoiding repeated forwarding. Therefore, air interface resources are saved to some extent, and a path with better performance may be selected as a transmission path from the service initiating device to the service responding device.

In step S203, the device C returns a response message.

Further, the device C receives the service discovery message sent by the device B in broadcast or unicast mode. Optionally, if the service discovery message is a service query message, the service identifier information carried in the service query message indicates the service information queried by the service initiating device. If the device C supports the service information, the device C may return a response message, or if the service discovery message is a service broadcast message, the service identifier information carried in the service discovery message indicates the service information supported by the service initiating device. When the device C determines that the service information supported by the device A is required, the device C may return a response message.

Optionally, the response message may further carry service identifier information. If the service discovery message is used to discover multiple pieces of service information, the service identifier information may indicate service information supported by the device C or service information required by the device C, that is, service information successfully matched between the device A and the device C. The device C may support one or more of the multiple pieces of service information. This is not limited in this embodiment of the present disclosure.

Optionally, the device C may determine, according to whether a first service identifier of the device A matches a second service identifier of the device C, whether the device C is a service responding device for the device A.

The first service identifier may be generated by the device A according to first service information of the device A, or generated by the device A according to change information in the NAN and first service information of the device A. The second service identifier is generated by the device C according to second service information of the device C, or generated according to the change information in the NAN and the second service information.

If the first service information is information about the service supported by the device A, the corresponding second service information is information about the service queried by the device C. If the first service information is information about the service queried by the device A, the corresponding second service information is information about the service supported by the device C.

The change information in the NAN may include at least one of the following information of an AMR, an MR, an MP, an AMP, an RF, an AMBTT, a TSF value, a cluster identifier, a CG, or an interface address, or a part or all of some information above. For example, some information of the TSF value may be selected to generate a service identifier. For example, last 24 bits of the TSF value may be selected to generate a service identifier.

Optionally, the first service identifier may be a SID, and is generated based on the service information of the service initiating device, for example, may be obtained after a hash operation is performed on the service information (or further, some information of a hash operation result is selected as the SID), or may be processed in combination with one or more of the change information in the NAN, for example, obtained by performing hash operation processing, or may be obtained by performing processing in combination with change information of the device A. This may ensure that the first service identifier changes dynamically, and prevent an eavesdropper from tracking. Optionally, the hash operation may be an SHA256 hash algorithm.

Further, the first service identifier may be a mapping that is generated after an operation is performed on the service information and one or more of the change information, and then is determined as the first service identifier information of the device A.

Optionally, the first service identifier may be indicated in the bitmap form described in step S201. Likewise, the device C may also map different second service information after computation to different bits in a bitmap of the second service identifier. By viewing whether bits in corresponding positions in a bitmap of the first service identifier are the same as those in the bitmap of the second service identifier, for example, if the bits in the corresponding positions are all 1, it may be determined that the service information of the device A matches the service information of the device C.

Optionally, when multiple service identifiers of the device C match multiple service identifiers of the device A, the device C may return a response message. If not all service identifiers are matched, the device C may not return a response message, or when multiple service identifiers of the device C partially match multiple service identifiers of the device A, the device C may return a response message. Partial matching may be understood to be that, the device C supports a part of multiple services that the device A needs to query, or the device C supports a part of multiple services queried by the device A.

Optionally, the response message may further indicate that the service responding device supports a part of services. Further, the response message may further indicate service information successfully matched between the device C and the device A.

Optionally, the response message may further carry path information, where the path information includes the identifier information of the service initiating device, the identifier information of the device B, and identifier information of the device C. The identifier information of the device may be MAC address information of the device. The path information may be carried in a MAC header of the response message. For example, address information of the response message may be set in the following manner. An SA may be set to the MAC address of the service initiating device, namely, the device A, an RA may be set to a broadcast address of the device B, for example, a WI-FI address, a TA is an address of the device C, and a DA may be the address of the device C.

Optionally, the response message may further include hop count information and a metric, where the metric is a metric from the device B to the device C, and the metric indicates quality of a path from the device B to the device C. The hop count information indicates a quantity of path segments from the service initiating device to the service responding device, and the hop count information may be determined according to a quantity of times that the service discovery message is forwarded from the service initiating device to the service responding device. If the service discovery message arrives at the service responding device after being forwarded by only one service forwarding device, the hop count from the service initiating device to the service responding device is 2. If the service discovery message arrives at the service responding device after being forwarded by n service forwarding devices, the hop count from the service initiating device to the service responding device is n+1. The hop count information may be used to determine a maximum transmission distance from the service initiating device to the service responding device.

Optionally, the device C may send the response message to the device B in unicast mode, or if the device C is in an NDC, the device C may broadcast the response message in the NDC in which the device C is located, for example, the device C may broadcast the response message in a base schedule of the NDC, or if the device is not in any NDC of the NAN, the device C may select to join an NDC, and then broadcast the response message in the NDC. This is not limited in this embodiment of the present disclosure.

In step S204, the device B or the device D forwards the response message.

After receiving the response message of the device C, the device B determines to forward the response message, and may update the path information of the response message according to the response message. Optionally, if the path information includes the metric, the metric may be further updated to the metric from the device C to the device B, where the metric indicates quality of the path from the device C to the device B.

Further, updated path information may include the identifier information of the service initiating device, the identifier information of the device B, and the identifier information of the service responding device, namely, the device C. For example, the address information of the response message may be set in the following manner. An SA may be set to the MAC address of the service initiating device, namely, the device A, an RA may be set to a broadcast address of the device C, for example, a WI-FI address, a TA is the address of the device B, and a DA may be the address of the device C.

Optionally, the device B may forward the response message to the device A in unicast mode, or if the device B and the device C are located in the same NDC, the device B may select not to forward the response message, or if the device B and the device C are not located in the same NDC, the device B may select to broadcast the response message in an NDC in which the device C has not broadcast the response message, or if the device B is located in multiple different NDCs, and another device has broadcast the response message in advance in one or more NDCs in which the device B is located, the device B may select to broadcast the response message in another NDC different from the one or more NDCs. For example, the device B is located in an $NDC_1$, an $NDC_2$, and an $NDC_3$, before the device B broadcasts the response message, if the device D has broadcast the response message in the $NDC_1$ and the $NDC_2$, the device may select to broadcast the response message in the $NDC_3$ only. That is, if a device has forwarded the response message in an NDC, other devices may select not to forward the response message. This may avoid a waste of air interface resources caused by broadcasting the response message for multiple times in the same NDC.

Optionally, the response message may indicate, by adding a related attribute used for discovering a multi-hop service to an existing message frame, for example, an SDF, an action frame, or a beacon frame, that the response message is used to implement path discovery within a multi-hop range, or may use a user-defined message format, or the like. This is not limited in this embodiment of the present disclosure.

In step S205, the device A obtains path information of the service responding device according to the response message.

Optionally, the device A may obtain the path information according to the response message forwarded by the device B or the device D, where the path information may include the identifier information of the service initiating device, namely, the device A, the identifier information of the device B or the device D, and the identifier information of the service responding device.

Optionally, the forwarded message of the response message may further include hop count information and a metric, where the metric is a metric from the device C to the device B or the device D.

If the device A receives forwarded messages of response messages returned by multiple service responding devices, the device A may determine, according to hop count information and/or metrics in the multiple forwarded messages, to select a service responding device to perform communication. For example, the device A receives forwarded messages of response messages that are sent by the device B and the device D. If the device A determines, according to the forwarded messages of the response messages that are sent by the device B and the device D, that a hop count from a service responding device indicated by a forwarded message of the device B to the service initiating device is less than a hop count from a service responding device indicated by a forwarded message of the device D to the service initiating device, that is, a service responding device on a path in which the device B is located is closer to the service initiating device, namely, the device A, than a service responding device on a path in which the device D is located, the device A may select to communicate with the service responding device on the path in which the device B is located. Alternatively, the device A may determine, according to metrics carried in the forwarded messages of the response messages that are sent by the device B and the device D, that the path in which the device B is located is better than the path in which the device D is located, and therefore may select to communicate with the service responding device on the path in which the device B is located. Likewise, by referring to other factors, the device A may also determine to communicate with one or more of service responding devices that return response messages.

Therefore, the method for service discovery in a NAN according to this embodiment of the present disclosure can implement a path discovery process in a service discovery process in order to reduce numerous air interface messages and save numerous time-frequency resources.

Figure 3:
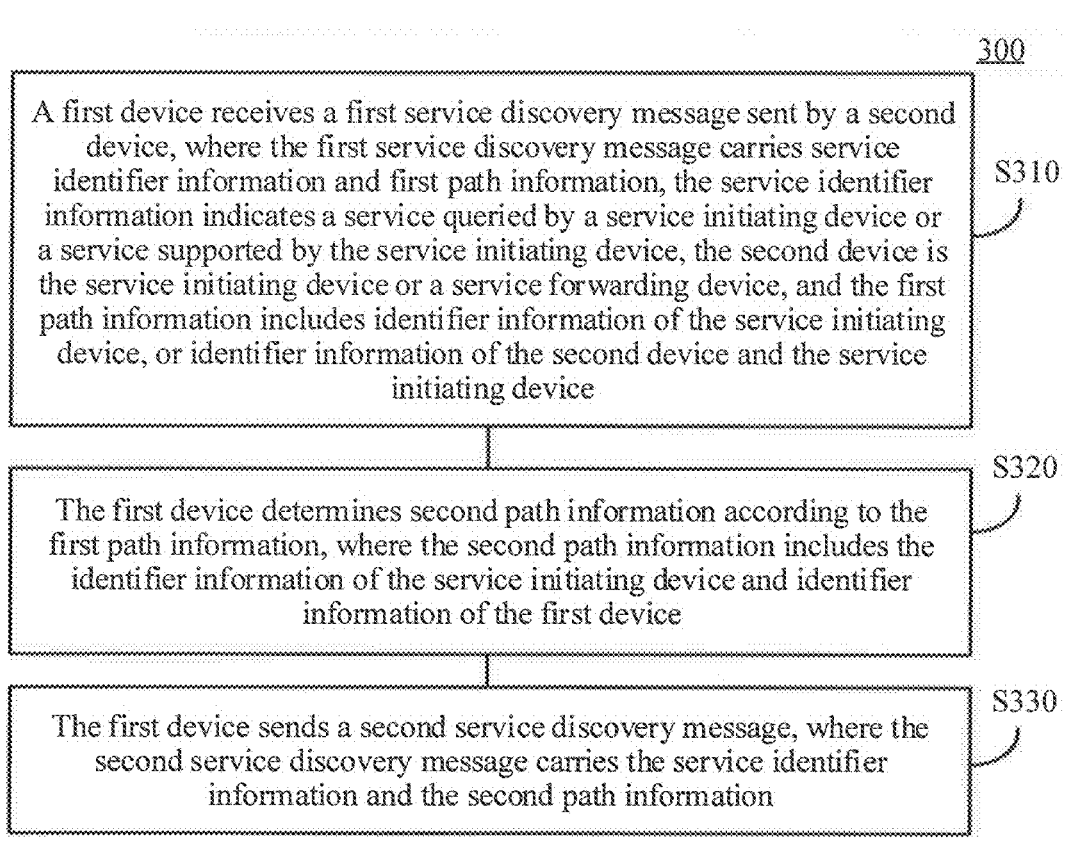
FIG. 3 is a schematic flowchart of a method for service discovery in a NAN according to another embodiment of the present disclosure.

FIG. 3 shows a schematic flowchart of a method 300 for service discovery in a NAN according to an embodiment of the present disclosure. The method is described from a perspective of a service forwarding device. As shown in FIG. 3, the method 300 may be performed by a first device, and the method 300 includes the following steps.

Step S310. A first device receives a first service discovery message sent by a second device, where the first service discovery message carries service identifier information and first path information, the service identifier information indicates a service queried by a service initiating device or a service supported by the service initiating device, the second device is the service initiating device or a service forwarding device, and the first path information includes identifier information of the service initiating device, or identifier information of the second device and the service initiating device.

Step S320. The first device determines second path information according to the first path information, where the second path information includes the identifier information of the service initiating device and identifier information of the first device.

Step S330. The first device sends a second service discovery message, where the second service discovery message carries the service identifier information and the second path information.

Further, the first device may be the device B in the method 200 for service discovery in a NAN in FIG. 2, and the first device may perform related actions of the device B in the method 200. The second device may be the device A in the method 200 for service discovery in a NAN in FIG. 2, or may be another service forwarding device, and the second device may perform related actions of the device A in the method 200, or related actions of the device B. If the second device is the service initiating device, the first service discovery message may be a service discovery message. If the second device is the service forwarding device, the first service discovery message may be a forwarded message of a service discovery message. The service identifier information carried in the first service discovery message indicates service information queried by the service initiating device or service information supported by the service initiating device.

Optionally, the service identifier information may be a SID of the service initiating device, or other identifier information that uniquely identifies the service initiating device.

The first device may obtain the first path information according to the first service discovery message. If the second device is the service initiating device, the first path information may include the identifier information of the service initiating device. If the second device is the service forwarding device, the first path information may include the identifier information of the service initiating device and the identifier information of the second device.

When the first device determines to send the second service discovery message, the first device updates the second path information included in the second service discovery message, where the second path information includes the identifier information of the service initiating device and the identifier information of the first device. Optionally, the identifier information of the first device may be a MAC address of the first device.

Optionally, the second path information may be carried in a MAC header of the second service discovery message. For example, address information in the MAC header of the second service discovery message may be set in the following manner. An SA may be set to a MAC address of the service initiating device, an RA may be set to a broadcast address of the second device, for example, a WI-FI address, and a TA is an address of the first device. Because no service responding device is found in this case, a DA may be null.

Optionally, the service discovery message may indicate, by adding a related attribute used for discovering a multi-hop service to an existing message frame, for example, an SDF, an action frame, or a beacon frame, that the service discovery message is used to discover a service responding device within a multi-hop range, or may use a user-defined message format, or the like. This is not limited in this embodiment of the present disclosure.

Further, for detailed steps S310-S330, refer to related descriptions in S201 and S202 in FIG. 2. Details are not described again herein to avoid repetition.

Therefore, the method for service discovery in a NAN according to this embodiment of the present disclosure can implement a path discovery process in a service discovery process in order to reduce numerous air interface messages and save numerous time-frequency resources.

Optionally, in an embodiment, the first service discovery message further carries change information in the NAN, and the service identifier information may be generated by the service initiating device according to service information of the service initiating device, or may be generated by the service initiating device according to the change information in the NAN and service information of the service initiating device, and the service information of the service initiating device indicates information about the service supported by the service initiating device or information about the service queried by the service initiating device, if the service information of the service initiating device is the information about the service supported by the service initiating device, service information of the first device is the information about the service queried by the first device, or if the service information of the service initiating device is the information about the service queried by the service initiating device, service information of the first device is the information about the service supported by the first device, and the change information in the NAN includes at least one of the following information an AMR, an MR, an MP, an AMP, an RF, an AMBTT, a TSF value, a cluster identifier, a CG, or a group key.

It should be understood that, the change information may include a part or all of a piece of information in the foregoing information. For example, the change information may include a part of the TSF value or the entire TSF value, or may include a part of the TSF value and the entire RF value. This is not limited in this embodiment of the present disclosure.

Further, the service initiating device may perform computation on the service information (for example, a service name or a hash value of a service name) and at least one of the change information to generate a mapping, and use the mapping as the service identifier information. For example, the service initiating device may perform a hash operation on the service information in combination with the TSF value to generate the service identifier information, or perform a hash operation on the service information in combination with some information of the TSF value to generate the service identifier information, or perform a hash operation on a hash value of the service information and a part of the TSF or the entire TSF to generate the service identifier information, or the like. This is not limited in this embodiment of the present disclosure.

Optionally, in an embodiment, the method 300 further includes determining that the first device is a service responding device for the service initiating device if the service identifier information matches a first service identifier of the first device, where the first service identifier is generated by the first device according to the service information of the first device, or generated according to the change information in the NAN and the service information of the first device, and the service information of the service initiating device indicates the information about the service supported by the service initiating device or the information about the service queried by the service initiating device, and if the service information of the service initiating device is the information about the service supported by the service initiating device, the service information of the first device is the information about the service queried by the first device, or if the service information of the service initiating device is the information about the service queried by the service initiating device, the service information of the first device is the information about the service supported by the first device.

Further, after obtaining the service identifier information of the service initiating device, the first device generates the first service identifier according to the service information of the first device in combination with at least one of the change information in the NAN, and then matches the service identifier information of the service initiating device with the first service identifier of the first device. If the matching is successful, the first device may determine that the first device is the service responding device for the service initiating device. If the service identifier information indicates the information about the service supported by the service initiating device, the service information based on which the first device generates the first service identifier is the information about the service queried by the first device, or if the service identifier information indicates the information about the service queried by the service initiating device, the service information based on which the first device generates the first service identifier is the information about the service supported by the first device.

That is, the first device may determine, according to whether the first service identifier matches the service identifier information of the service initiating device, whether the first device is the service responding device for the service initiating device, and if matching is successful, return a response message, or else, skip returning a response message.

Further, for a detailed generation process and a matching process of the service identifier, refer to related descriptions in step S203 in FIG. 2. Details are not described again herein to avoid repetition.

Optionally, in an embodiment, the first service discovery message may further carry identifier change regularity information of the service initiating device, and the identifier change regularity information indicates change regularity of the identifier information of the service initiating device such that after the identifier information of the service initiating device changes, a device that receives the service discovery message identifies the service initiating device according to the identifier change regularity information or updates the identifier information of the service initiating device according to the identifier change regularity information.

Further, to prevent an eavesdropper from tracking, the service identifier information of the service initiating device may change. Optionally, in this case, the first service discovery message may further carry the identifier change regularity information of the service initiating device. In this way, if the identifier information of the service initiating device changes, the device that receives the first service discovery message may identify the service initiating device according to the identifier change regularity information, and may further update the recorded identifier information of the service initiating device according to the identifier change regularity information. Therefore, security and privacy of the service discovery process are enhanced.

Optionally, in an embodiment, before the first device sends the second service discovery message, the method 300 may further include sending the second service discovery message when the first device has a forwarding capability, or cancel sending the second service discovery message when the first device has no forwarding capability.

Optionally, the first device may further determine, according to a sequence number carried in the first service discovery message, whether to forward the first service discovery message.

Further, for a detailed step, refer to related descriptions in step S202 in FIG. 2. Details are not described again herein to avoid repetition.

Optionally, in another embodiment, the first service discovery message further carries at least one of the following information of sleep regularity of the second device, a sleep time of the second device, work regularity of the second device, or a work time of the second device such that the first device computes a first metric between the first device and the second device.

For example, the first device may express work time information of the second device in a bitmap form, and then compute the first metric information between the first device and the second device by comparing work time information of the first device with the work time information of the second device in the bitmap.

Further, for a detailed step, refer to related descriptions in step S201 in FIG. 2. Details are not described again herein to avoid repetition.

Optionally, in another embodiment, the second path information further includes the first metric, and the first metric is represented by one of the following items of an intersection of a wake-up time of the second device and a wake-up time of the first device, an intersection of a base schedule of an NDC in which the first device is located and a base schedule of an NDC in which the second device is located, an MP of the first device, a device rank MR of the first device, duration of a base schedule of an NDC in which the first device is located, or role information of the first device.

Optionally, the first metric may be further represented according to other parameters, for example, may be represented according to at least one of the following information transmission duration airtime of the first device and the second device, communication costs of the first device and the second device, sleep regularity of the second device, bandwidth required by the first device, bandwidth required by the second device, reliability required by the first device, reliability required by the second device, a delay required by the first device, a delay required by the second device, load of the first device, load of the second device, time-frequency resource information of the second device, or quality of service information (Quality of Service (QoS)).

The time-frequency resource information may indicate time information and channel information that can be used by the first device to transmit data. The time-frequency resource information may indicate a work time period and a channel of the first device in a DW interval, or work time periods and channels of the first device in several DW intervals, or a work time period, a sleep time period, work regularity, and sleep regularity of the first device, or the like. For example, the time-frequency resource information may indicate a quantity of DWs or DW intervals in which the first device sleeps, or indicate in which time period in a DW interval the first device sleeps but in other time periods the first device works on a channel. Further, the time-frequency resource information may be described by using a bitmap, a bloom filter, a start work time and work duration of the device, or a start work time and an end work time of the device, or the like. This is not limited in this embodiment of the present disclosure.

indication manner of the time-frequency resource is not limited in this embodiment of the present disclosure. The bitmap may also indicate time-frequency resource information in multiple consecutive DWs and adjacent DW intervals, or may indicate regularity of time-frequency resources of the device that may be used for transmitting data and therefore express time-frequency resource information within a relatively long time, and the like. It should be noted that, regularity of time-frequency resources may also be specified according to a standard. As shown in Table 1, the bitmap expresses time-frequency resource information within every 512-TU time period. As can be seen from Table 1, the device works on a channel 6 in zeroth to fifth 16 TUs, and works on a channel 11 in sixth to twentieth 16 TUs, and works on a channel 1 in twenty-first to thirty-first 16 TUs.

TABLE 1

| | Channel number | Duration of a minimum time unit | Bitmap of available time-frequency resources | | | | | | | | | | | | | | | |
|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 |
| Time-frequency resources supported by the device | 1 | 16 TUs | | | | | | | | | | | | | | | | |
| | 6 | 16 TUs | 1 | 1 | 1 | 1 | 1 | 1 | | | | | | | | | | |
| | 11 | 16 TUs | | | | | | | 1 | 1 | 1 | 1 | 1 | 1 | 1 | 1 | 1 | 1 |

| | Channel number | Duration of a minimum time unit | Bitmap of available time-frequency resources | | | | | | | | | | | | | | | |
|---|---|---|---|---|---|---|---|---|---|---|---|---|---|---|---|---|---|---|
| | | | 16 | 17 | 18 | 19 | 20 | 21 | 22 | 23 | 24 | 25 | 26 | 27 | 28 | 29 | 30 | 31 |
| Time-frequency resources supported by the device | 1 | 16 TUs | | | | | | 1 | 1 | 1 | 1 | 1 | 1 | 1 | 1 | 1 | 1 | 1 |
| | 6 | 16 TUs | | | | | | | | | | | | | | | | |
| | 11 | 16 TUs | 1 | 1 | 1 | 1 | 1 | | | | | | | | | | | |

The following describes in detail a representation form of the time-frequency resource information by using a bitmap as an example. Table 1 shows a quantized representation form of the time-frequency resource information. In Table 1, a first dimension of the bitmap is time information, 16 TUs are used as a minimum time unit of the device working on a channel, and within every 16 TUs, the device is in a sleep state or works on a channel. A second dimension of the bitmap is channel information, namely, information about a channel on which the device can work. Setting a bitmap corresponding to a channel and a minimum time unit to 1 may indicate that the device runs on the channel in a time period indicated by the minimum time unit, and setting a bitmap corresponding to a channel and a minimum time unit to 0 or to null indicates that the device enters the sleep state in a time period indicated by the minimum time unit, setting a bitmap corresponding to a channel and a minimum time unit to 0 or to null may indicate that the device runs on the channel in a time period indicated by the minimum time unit, and setting a bitmap corresponding to a channel and a minimum time unit to 1 indicates that the device enters the sleep state in a time period indicated by the minimum time unit, or available time-frequency resource information of the device may be indicated in another indication manner. The It should be understood that, setting 1, 0, or null in Table 1 to indicate whether time-frequency resources are available is only a reliable indication method, or other methods may be used for indicating. It should also be understood that, the channels 1, 6, and 11 included in the second dimension of the bitmap are used as an example for description and for ease of expression only. In an actual NAN system, channel numbers in a bitmap may include the channel 1 to the channel 11 (the channel 1 to channel 13 may also be included in some countries), indicating that the device may work on any one of the 11 channels in a timeslot.

The QoS information may be expressed in multiple manners. For example, refer to an enhanced distributed channel access (EDCA) mechanism specified in Institute of Electrical and Electronics Engineers (IEEE) 802.11. In the EDCA mechanism, services indicated by the QoS information are classified into four categories background access category (AC_BK), best-effort access category (AC_BE), video access category (AC_VI), and voice access category (AC_VO). Because the service categories require different transmission delays, when the service information carries the QoS information, time-frequency resources may be scheduled according to a QoS category indicating the service. Alternatively, the QoS information may be expressed by using traffic specification (TSPEC) elements. A structure of the TSPEC elements is shown in Table 2. The service information may carry all elements in Table 2, or may carry some elements in Table 2, for example, carry at least one of a minimum data transmission rate, an average data transmission rate, a peak data transmission rate, or a traffic burst size, or certainly may carry other elements in Table 2, for example, carry at least one of a maximum service interval, a minimum service interval, a maximum data transmission rate, a minimum data transmission rate, an average data transmission rate, a maximum packet transmission time, a preferred packet transmission time, a maximum transmission delay, a preferred data transmission delay, or a burst data packet size (Burst Size). In this case, in other words, QoS may indicate at least one of the maximum service interval, the minimum service interval, the maximum data transmission rate, the minimum data transmission rate, the average data transmission rate, the maximum packet transmission time, the preferred packet transmission time, the maximum transmission delay, the preferred data transmission delay, or the burst data packet size, or the like that is required for ensuring user experience. This is not limited in this embodiment of the present disclosure.

device, and the first device forwards the first service discovery message, and does not forward the third service discovery message.

The fifth device is another service forwarding device. The first device may receive the third service discovery message sent by the fifth device, or may receive the first service discovery message sent by the second device. That is, the first device may receive service discovery messages forwarded by multiple devices. The first device may determine, according to metrics in the multiple forwarded messages, to forward a service discovery message sent by a device. For a detailed step, refer to related descriptions in step S202 in FIG. 2. Details are not described again herein to avoid repetition.

Optionally, in still another embodiment, the first metric is represented by the intersection of the wake-up time of the second device and the wake-up time of the first device, and the second metric is represented by an intersection of a wake-up time of the fifth device and the wake-up time of the first device. That the first device determines, according to the first metric and the second metric, that a path between the first device and the second device is better than a path between the first device and the fifth device, includes that if

TABLE 2

| Field name | Element identifier | Length | Transmission stream information | Nominal MAC service data unit size | Maximum MAC service data unit size | Minimum service interval | Maximum service interval | Static interval | Pause interval |
|---|---|---|---|---|---|---|---|---|---|
| Bits | 1 | 1 | 3 | 2 | 2 | 4 | 4 | 4 | 4 |

| Field name | Service start time | Minimum data transmission rate | Average data transmission rate | Peak data transmission rate | Traffic burst size | Delay range | Minimum physical rate | Remaining bandwidth quota | Media time |
|---|---|---|---|---|---|---|---|---|---|
| Bits | 4 | 4 | 4 | 4 | 4 | 4 | 4 | 2 | 2 |

Further, for how to represent the first metric according to the foregoing information, refer to related descriptions in step S201 in FIG. 2. Details are not described again herein to avoid repetition.

Optionally, the first metric may also be computed according to the following formula:

$$C_a = \left(o + \frac{B_t}{r}\right)\frac{1}{1-e_f},$$

where O is channel load (overhead), $B_t$ is a quantity of bits, r is a data rate, and $e_f$ is a probability.

Optionally, in still another embodiment, the method 300 may further include that the first device receives a third service discovery message from a fifth device, where the third service discovery message carries a second metric, and the third service discovery message carries the service identifier information and fifth path information, and the fifth path information includes the identifier information of the service initiating device, identifier information of the fifth device, and the second metric, the first device determines, according to the first metric and the second metric, that a path between the first device and the second device is better than a path between the first device and the fifth the intersection of the wake-up time of the second device and the wake-up time of the first device is longer than the intersection of the wake-up time of the fifth device and the wake-up time of the first device, the first metric is greater than the second metric, and when the first metric is greater than the second metric, the first device determines that the path between the first device and the second device is better than the path between the first device and the fifth device, or if the intersection of the wake-up time of the second device and the wake-up time of the first device is longer than the intersection of the wake-up time of the fifth device and the wake-up time of the first device, the first metric is less than the second metric, and when the first metric is less than the second metric, the first device determines that the path between the first device and the second device is better than the path between the first device and the fifth device.

Optionally, in still another embodiment, the method 300 may further include that the first device receives a first response message sent by a third device, where the first response message indicates that the third device is a service responding device for the service initiating device, the first response message carries third path information, and the third path information includes the identifier information of the service initiating device and identifier information of the third device, the first device determines fourth path information according to the third path information, where the fourth path information includes the identifier information of the service initiating device, the identifier information of the first device, and the identifier information of the third device, and the first device sends a second response message, where the second response message carries the fourth path information.

Optionally, if the third device has broadcast the first response message in a first NDC, the first device may select to broadcast the second response message in another NDC different from the first NDC. This may avoid a waste of system resources caused by broadcasting the response message in an NDC by multiple devices.

The third device may be the device C in the method 200 in FIG. 2. The third device may perform related actions of the device C in the method 200. The first response message may be the response message returned by the device C in the method 200 in FIG. 2. For a detailed step, refer to related descriptions in steps S203 and S204 in FIG. 2. Details are not described again herein to avoid repetition.

Optionally, in still another embodiment, a fourth device is a device that forwards the first response message. The first device is located in the first NDC, and the fourth device is located in a second NDC. Before the first device sends the second response message, the method further includes that the first device receives a third response message that the fourth device broadcasts in the second NDC, where the third response message is the first response message that is forwarded, and if the first NDC and the second NDC are different NDCs, the first device broadcasts the second response message in the first NDC, or if the first NDC and the second NDC are the same NDC, the first device does not broadcast the second response message in the first NDC.

The fourth device may be the device D in the method 200 in FIG. 2. The fourth device may perform related actions of the device D in the method 200. For details, refer to related descriptions in step S204 in FIG. 2. Details are not described again herein to avoid repetition.

Optionally, in still another embodiment, a message format of the second service discovery message is one of the following formats an SDF message format, an action frame message format, a beacon frame message format, or a user-defined message format.

Optionally, the service discovery message further carries multi-hop indication information, where the multi-hop indication information is used to discover a service responding device within a multi-hop range, and "multi-hop" means that the service discovery message needs to be forwarded by service forwarding devices before being transmitted to the service responding device.

Therefore, in the method for service discovery in a NAN in this embodiment of the present disclosure, a connection relationship between devices does not need to be established in the process of determining the path between the service initiating device and the service responding device, but the path between the service initiating device and the service responding device may be determined in the service discovery process of the service responding device. Therefore, numerous air interface messages are reduced, and numerous air interface resources are saved.

Figure 4:
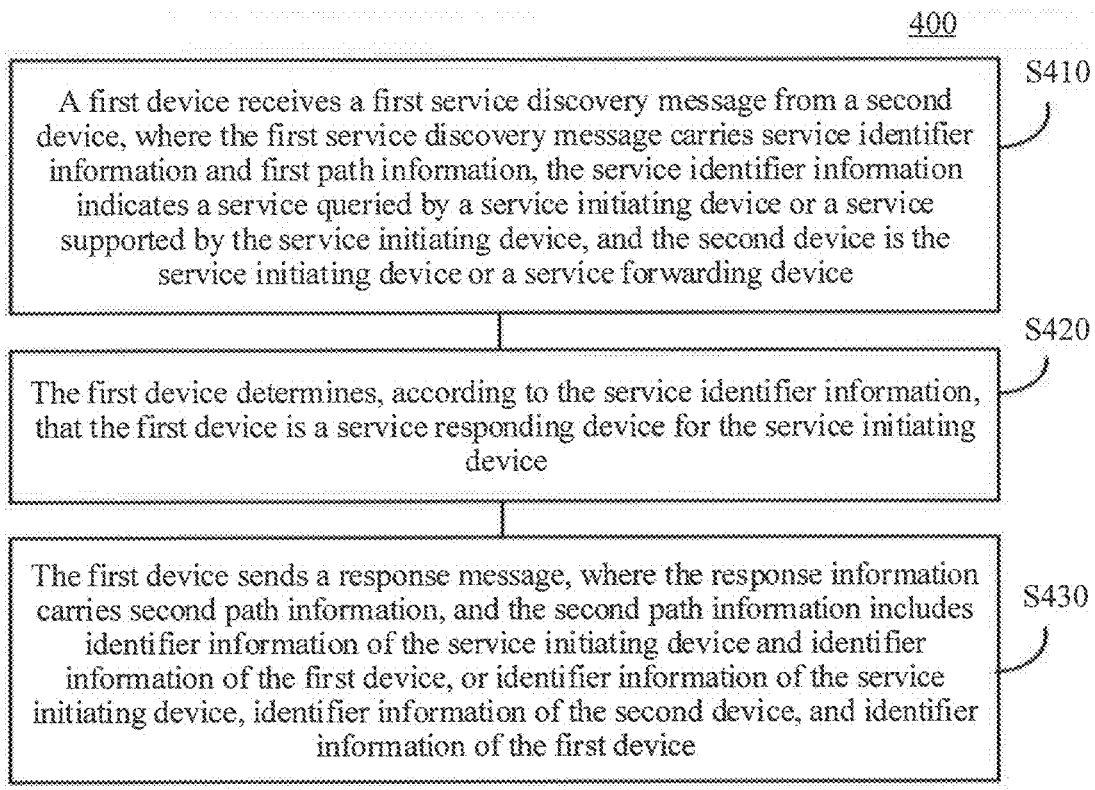
FIG. 4 is a schematic flowchart of a method for service discovery in a NAN according to still another embodiment of the present disclosure.

FIG. 4 shows a schematic flowchart of a method 400 for service discovery in a NAN according to an embodiment of the present disclosure. The method is described from a perspective of a service responding device. The method 400 is performed by a first device. As shown in FIG. 4, the method 400 includes the following steps.

Step S410. A first device receives a first service discovery message from a second device, where the first service discovery message carries service identifier information and first path information, the service identifier information indicates a service queried by a service initiating device or a service supported by the service initiating device, and the second device is the service initiating device or a service forwarding device.

Step S420. The first device determines, according to the service identifier information, that the first device is a service responding device for the service initiating device.

Step S430. The first device sends a response message, where the response information carries second path information, and the second path information includes identifier information of the service initiating device and identifier information of the first device, or identifier information of the service initiating device, identifier information of the second device, and identifier information of the first device.

Further, the second device may be the device B in the method 200 in FIG. 2, and the second device may perform related actions of the device B in the method 200. The first device may be the device C in the method 200 in FIG. 2, and the first device may perform related actions of the device C in the method 200.

Optionally, in an embodiment, that the first device sends a response message includes that the first device sends the response information to the second device, if the first device is located in a first NDC, the first device broadcasts the response message in the first NDC, if the terminal device is located in at least two NDCs, the terminal device broadcasts the response message in at least one of the at least two NDCs, or if the first device is not located in any NDC in the NAN, the first device joins a second NDC in the NAN, and broadcasts the response message in the second NDC.

The second NDC may be the first NDC, or may be one of the at least two NDCs, or the first device may join multiple NDCs and broadcast the response message in one or more NDCs. This is not limited in this embodiment of the present disclosure.

Optionally, in an embodiment, that the first device determines, according to the service identifier information, that the first device is a service responding device for the service initiating device, includes that when the service identifier information matches a first service identifier of the first device, the first device determines that the first device is the service responding device for the service initiating device, where the service identifier information is generated by the service initiating device according to service information of the service initiating device, or generated by the service initiating device according to change information in the NAN and service information of the service initiating device, the first service identifier is generated by the first device according to service information of the first device, or generated by the first device according to the change information in the NAN and service information of the first device, and the service information of the service initiating device indicates information about the service supported by the service initiating device or information about the service queried by the service initiating device, if the service information of the service initiating device is the information about the service supported by the service initiating device, the service information of the first device is the information about the service queried by the first device, or if the service information of the service initiating device is the information about the service queried by the service initiating device, the service information of the first device is the information about the service supported by the first device, and the change information in the NAN includes at least one of the following information of an AMR, an MR, an MP, an AMP, an RF, an AMBTT, a TSF value, a cluster identifier, a CG, or a group key.

Optionally, in still another embodiment, the method 400 further includes forwarding, by the service responding device, the first service discovery message, or determining, according to diffusion indication information carried in the first service discovery message, whether to forward the first service discovery message, where the diffusion indication information indicates whether to forward the forwarded message when the service of the service responding device matches the service of the service initiating device.

Optionally, if the service discovery message carries multiple pieces of service information, and the service responding device meets one or more pieces of the service information, the diffusion indication information may further indicate that the forwarded message is to be diffused in order to discover a service responding device meeting other service information.

Optionally, in still another embodiment, the response message may further include hop count information and a first metric, the hop count information is determined according to a quantity of times that the service discovery message is forwarded during transmission from the service initiating device to the service responding device, and the first metric is used to measure quality of a path between the first device and the second device.

For details, refer to related descriptions in steps S203 and S204 in FIG. 2. Details are not described again herein to avoid repetition.

Therefore, the method for service discovery in a NAN according to this embodiment of the present disclosure can implement a path discovery process in a service discovery process in order to reduce numerous air interface messages and save numerous time-frequency resources.

Figure 5:
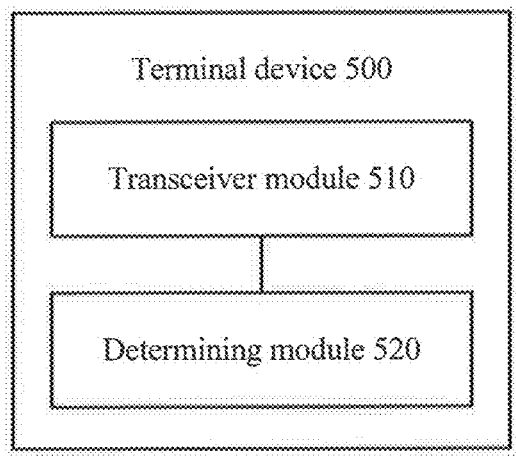
FIG. 5 is a schematic block diagram of a terminal device according to an embodiment of the present disclosure.

FIG. 5 shows a schematic block diagram of a terminal device 500 according to an embodiment of the present disclosure. As shown in FIG. 5, the terminal device 500 includes a transceiver module 510 configured to receive a first service discovery message sent by a second device, where the first service discovery message carries service identifier information and first path information, the service identifier information indicates a service queried by a service initiating device or a service supported by the service initiating device, the second device is the service initiating device or a service forwarding device, and the first path information includes identifier information of the service initiating device, or identifier information of the second device and the service initiating device, and a determining module 520 configured to determine second path information according to the first path information, where the second path information includes the identifier information of the service initiating device and identifier information of the terminal device, where the transceiver module 510 is further configured to send a second service discovery message, where the second service discovery message carries the service identifier information and the second path information.

Therefore, the terminal device for service discovery in a NAN according to this embodiment of the present disclosure can implement a path discovery process in a service discovery process in order to reduce numerous air interface messages and save numerous time-frequency resources.

The terminal device 500 according to this embodiment of the present disclosure may correspond to the first device in the method 300 for service discovery in a NAN in the embodiment of the present disclosure or the device B in the method 200 for service discovery in a NAN according to the embodiment of the present disclosure, and the foregoing and other operations and/or functions of each module in the terminal device 500 are respectively intended to implement the corresponding procedure of each method in FIG. 2 and FIG. 3. Details are not described again herein for brevity.

Figure 6:
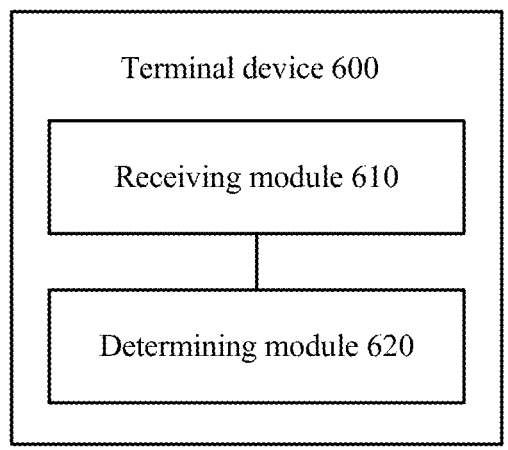
FIG. 6 is a schematic block diagram of a terminal device according to another embodiment of the present disclosure.

FIG. 6 shows a schematic block diagram of a terminal device 600 according to another embodiment of the present disclosure. As shown in FIG. 6, the terminal device 600 includes a transceiver module 610 configured to receive a first service discovery message from a second device, where the first service discovery message carries service identifier information and first path information, the service identifier information indicates a service queried by a service initiating device or a service supported by the service initiating device, and the second device is the service initiating device or a service forwarding device, and a determining module 620 configured to determine, according to the service identifier information, that the terminal device is a service responding device for the service initiating device, where the transceiver module 610 is further configured to send a response message, where the response information carries second path information, and the second path information includes identifier information of the service initiating device and identifier information of the terminal device, or identifier information of the service initiating device, identifier information of the second device, and identifier information of the terminal device.

Therefore, the terminal device for service discovery in a NAN according to this embodiment of the present disclosure can implement a path discovery process in a service discovery process in order to reduce numerous air interface messages and save numerous time-frequency resources.

The terminal device 600 according to this embodiment of the present disclosure may correspond to the first device in the method 400 for service discovery in a NAN in the embodiment of the present disclosure or the device C in the method 200 for service discovery in a NAN according to the embodiment of the present disclosure, and the foregoing and other operations and/or functions of each module in the terminal device 600 are respectively intended to implement the corresponding procedure of each method in FIG. 2 and FIG. 4. Details are not described again herein for brevity.

Figure 7:
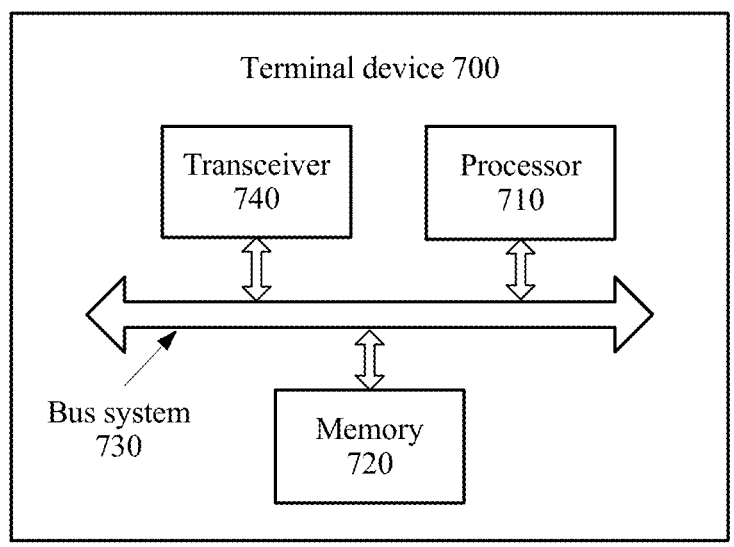
FIG. 7 is a schematic block diagram of a terminal device according to an embodiment of the present disclosure.

As shown in FIG. 7, an embodiment of the present disclosure further provides a terminal device 700. The terminal device 700 includes a processor 710, a memory 720, a bus system 730, and a transceiver 740. The processor 710, the memory 720, and the transceiver 740 are connected by the bus system 730. The memory 720 is configured to store an instruction, and the processor 710 is configured to execute the instruction stored in the memory 720 in order to receive a signal or send a signal through the transceiver 740. A structure of the terminal device 700 shown in FIG. 7 does not constitute a limitation to this embodiment of the present disclosure. The structure may be a bus structure, or may be a star structure. Further, a quantity of parts included may be greater or less than that shown in FIG. 7, or some parts are combined, or parts are arranged in a different manner, or the like. The transceiver 740 is configured to receive a first service discovery message sent by a second device, where the first service discovery message carries service identifier information and first path information, the service identifier information indicates a service queried by a service initiating device or a service supported by the service initiating device, the second device is the service initiating device or a service forwarding device, and the first path information includes identifier information of the service initiating device, or identifier information of the second device and the service initiating device. The processor 710 is configured to determine second path information according to the first path information, where the second path information includes the identifier information of the service initiating device and identifier information of the terminal device. The transceiver 740 is further configured to send a second service discovery message, where the second service discovery message carries the service identifier information and the second path information.

It should be understood that, in this embodiment of the present disclosure, the processor 710 may be a central processing unit (CPU), or the processor 710 may be another general purpose processor, a digital signal processor (DSP), an application-specific integrated circuit (ASIC), a field programmable gate array (FPGA), or another programmable logic device, a discrete gate or transistor logic device, a discrete hardware component, or the like. The general purpose processor may be a microprocessor, or the processor 710 may be any conventional processor, or the like.

The memory 720 may include a read-only memory (ROM) and a random access memory (RAM), and provide an instruction and data to the processor 710. A part of the memory 720 may further include a nonvolatile RAM. For example, the memory 720 may further store information about a device type.

The bus system 730 may further include a power bus, a control bus, a status signal bus, and the like, in addition to a data bus. However, for clear description, various buses in the figure are marked as the bus system 730.

In an implementation process, each step of the foregoing methods may be completed by using an integrated logic circuit of hardware in the processor 710 or an instruction in a form of software. The steps of the methods disclosed with reference to the embodiments of the present disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 720. The processor 710 reads information in the memory 720 and completes the steps in the foregoing methods in combination with the hardware of the processor 710. Details are not described again herein to avoid repetition.

Therefore, the terminal device for service discovery in a NAN according to this embodiment of the present disclosure can implement a path discovery process in a service discovery process in order to reduce numerous air interface messages and save numerous time-frequency resources.

The terminal device 700 according to this embodiment of the present disclosure may correspond to the first device in the method 300 for service discovery in a NAN in the embodiment of the present disclosure or the device B in the method 200 for service discovery in a NAN according to the embodiment of the present disclosure, and the foregoing and other operations and/or functions of each module in the terminal device 700 are respectively intended to implement the corresponding procedure of each method in FIG. 2 and FIG. 3. Details are not described again herein for brevity.

Figure 8:
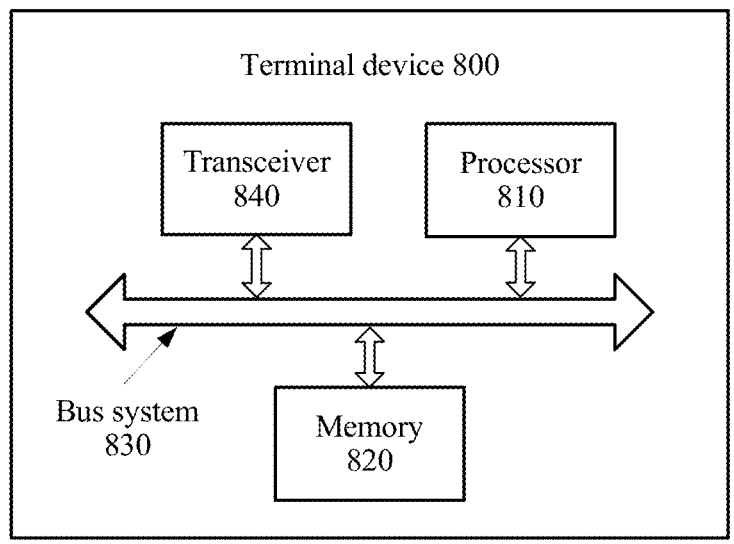
FIG. 8 is a schematic block diagram of a terminal device according to another embodiment of the present disclosure.

As shown in FIG. 8, an embodiment of the present disclosure further provides a terminal device 800. The terminal device 800 includes a processor 810, a memory 820, a bus system 830, and a transceiver 840. The processor 810, the memory 820, and the transceiver 840 are connected by the bus system 830. The memory 820 is configured to store an instruction, and the processor 810 is configured to execute the instruction stored in the memory 820 in order to receive a signal or send a signal through the transceiver 840. A structure of the terminal device 800 shown in FIG. 8 does not constitute a limitation to this embodiment of the present disclosure. The structure may be a bus structure, or may be a star structure. Further, a quantity of parts included may be greater or less than that shown in FIG. 8, or some parts are combined, or parts are arranged in a different manner, or the like. The transceiver 840 is configured to receive a first service discovery message from a second device, where the first service discovery message carries service identifier information and first path information, the service identifier information indicates a service queried by a service initiating device or a service supported by the service initiating device, and the second device is the service initiating device or a service forwarding device. The processor 810 is configured to determine, according to the service identifier information, that the terminal device is a service responding device for the service initiating device. The transceiver 840 is further configured to send a response message, where the response information carries second path information, and the second path information includes identifier information of the service initiating device and identifier information of the terminal device, or identifier information of the service initiating device, identifier information of the second device, and identifier information of the terminal device.

It should be understood that, in this embodiment of the present disclosure, the processor 810 may use various interfaces and lines to connect each part of the entire terminal device, and by running or executing a software program and/or module stored in the memory 820, and invoking data stored in the memory 820, perform various functions of the terminal device and/or process data. The processor 810 may be a CPU, or the processor 810 may be another general purpose processor, a DSP, an ASIC, an FPGA, or another programmable logic device, a discrete gate or transistor logic device, a discrete hardware component, or the like. The general purpose processor may be a microprocessor, or the processor may be any conventional processor, or the like.

The memory 820 may include a ROM and a RAM, and may be configured to store a software program and module, and provide an instruction and data to the processor 810. The memory 820 may include a program storage area and a data storage area. The program storage area may store an operating system, an application program required by at least one function, such as an audio playing program or an image playing program. The data storage area may store data (such as audio data or a phone book) that is created according to use of the electronic device, or the like. A part of the memory 820 may further include for example, a nonvolatile RAM (NVRAM), a phase change RAM (PRAM), or a magnetoresistive RAM (MRAM), and may further include for example, at least one disk storage device, an electrically erasable programmable ROM (EEPROM), or a flash memory device such as a NOR flash memory or a NAND flash. The memory 820 may store the operating system and application program executed by the processor 810. The memory 820 may further store information about a device type.

The bus system 830 may further include a power bus, a control bus, a status signal bus, and the like, in addition to a data bus. However, for clear description, various buses in the figure are marked as the bus system 830.

In an implementation process, each step of the foregoing methods may be completed by using an integrated logic circuit of hardware in the processor 810 or an instruction in a form of software. The steps of the methods disclosed with reference to the embodiments of the present disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 820. The processor 810 reads information in the memory 820 and completes the steps in the foregoing methods in combination with the hardware of the processor 810. Details are not described again herein to avoid repetition.

Therefore, the terminal device for service discovery in a NAN according to this embodiment of the present disclosure can implement a path discovery process in a service discovery process in order to reduce numerous air interface messages and save numerous time-frequency resources.

The terminal device 800 according to this embodiment of the present disclosure may correspond to the first device in the method 400 for service discovery in a NAN in the embodiment of the present disclosure or the device C in the method 200 for service discovery in a NAN according to the embodiment of the present disclosure, and the foregoing and other operations and/or functions of each module in the terminal device 800 are respectively intended to implement the corresponding procedure of each method in FIG. 2 and FIG. 4. Details are not described again herein for brevity.

The term "and/or" in this specification describes only an association relationship for describing associated objects and represents that three relationships may exist. For example, A and/or B may represent the following three cases, where only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for service discovery in a neighbor awareness network (NAN), comprising:
   receiving, by a first device, a first service discovery message from a second device, wherein the first service discovery message carries service identifier information and first path information, wherein the service identifier information indicates a service queried by either a service initiating device or the service supported by the service initiating device, wherein the second device comprises either the service initiating device or a service forwarding device, and wherein the first path information comprises: (a) either identifier information of the service initiating device or identifier information of the second device; and (b) the service initiating device;
   determining, by the first device, second path information according to the first path information, wherein the second path information comprises the identifier information of the service initiating device and identifier information of the first device;

sending, by the first device, a second service discovery message carrying the service identifier information and the second path information by:
   sending, by the first device, the second service discovery message in a discovery window (DW) of the NAN when the first device is not located in any NAN data cluster (NDC) in the NAN;
   sending, by the first device, the second service discovery message in a first NDC when the first device is located in the first NDC; and
   sending, by the first device, a second service discovery message in at least one of at least two NDCs when the first device is located in the at least two NDCs;

receiving, by the first device, a first response message from a third device, wherein the first response message indicates that the third device comprises a service responding device for the service initiating device, wherein the first response message carries third path information, and wherein the third path information comprises the identifier information of the service initiating device and identifier information of the third device;

determining, by the first device, fourth path information according to the third path information, wherein the fourth path information comprises the identifier information of the service initiating device, the identifier information of the first device, and the identifier information of the third device; and when the first NDC and the second NDC are not the same NDC, sending, by the first device, a second response message carrying the fourth path information by:
   sending, by the first device, the second response message to the second device;
   broadcasting, by the first device, the second response message in the first NDC when the first device is located in the first NDC; and
   broadcasting, by the first device, the second response message in the at least one of the at least two NDCs when the first device is located in the at least two NDCs.

2. The method of claim 1, wherein a fourth device comprises a device forwarding the first response message, wherein the first device is located in the first NDC, the fourth device is located in a second NDC, and wherein before sending the second response message, the method further comprises receiving, by the first device, a third response message from the fourth device, wherein the third response message comprises the first response message.

3. The method of claim 1, wherein the second path information further comprises a first metric measuring quality of a path between the first device and the second device, and wherein the first metric is represented by at least one of the following parameters:
   an intersection of a wake-up time of the first device and a wake-up time of the second device;
   an intersection of a base schedule of an NDC in which the first device is located and a base schedule of an NDC in which the second device is located;
   a duration of the base schedule of the NDC in which the first device is located, a master preference (MP) of the first device, and a master rank (MR) of the first device; or
   role information of the first device in the NAN.

4. A method for service discovery in a neighbor awareness network (NAN), comprising:
   receiving, by a first device, a first service discovery message from a second device, wherein the first service discovery message carries service identifier information and first path information, wherein the service identifier information indicates a service queried by either a service initiating device or the service supported by the service initiating device, wherein the second device comprises either the service initiating device or a service forwarding device, and wherein the first path information comprises (a) either identifier information of the service initiating device or identifier information of the second device and (b) the service initiating device;
   determining, by the first device, second path information according to the first path information, wherein the second path information comprises the identifier information of the service initiating device and identifier information of the first device;
   sending, by the first device, a second service discovery message carrying the service identifier information and the second path information, wherein the second path information further comprises a first metric measuring quality of a path between the first device and the second device;
   receiving, by the first device, a third service discovery message from a fifth device, wherein the third service discovery message carries the service identifier information and fifth path information, and wherein the fifth path information comprises the identifier information of the service initiating device, identifier information of the fifth device and a second metric measuring quality of a path between the first device and the fifth device;
   determining, by the first device according to the first metric and the second metric, that the path between the first device and the second device is better than the path between the first device and the fifth device; and
   forwarding, by the first device, the first service discovery message.

5. The method of claim 1, wherein the first service discovery message further carries at least one of the following: information of sleep regularity of the second device, a sleep time of the second device, work regularity of the second device, or a work time of the second device, wherein the method further comprises computing, by the first device, a first metric between the first device and the second device, and wherein the first metric measures quality of a path between the first device and the second device.

6. The method of claim 1, wherein the first service discovery message further carries change information in the NAN, and wherein the method further comprises determining that the first device comprises a service responding device for the service initiating device when the service identifier information matches a first service identifier, wherein the service identifier information is generated by the service initiating device according to either (a) service information of the service initiating device or (b) the change information in the NAN and the service information of the service initiating device, wherein the first service identifier is generated by the first device according to either (a) service information of the first device or (b) the change information in the NAN and the service information of the first device, wherein the service information of the service initiating device indicates either information about the service supported by the service initiating device or information about the service queried by the service initiating device, wherein the service information of the first device comprises the information about the service queried by the first device when the service information of the service initiating device comprises the information about the service supported by the service initiating device, wherein the service information of the first device comprises the information about the service supported by the first device when the service information of the service initiating device comprises the information about the service queried by the service initiating device, and wherein the change information in the NAN comprising at least one of the following information:
  an anchor master rank (AMR);
  a master rank (MR);
  a master preference (MP);
  an anchor master preference (AMP);
  a random factor (RF);
  an anchor master beacon transmission time (AMBTT);
  a time synchronization function (TSF) value;
  a cluster identifier;
  a cluster grade (CG); or
  a group key.

7. A method for service discovery in a neighbor awareness network (NAN), comprising:
  receiving, by a first device, a first service discovery message from a second device, wherein the first service discovery message carries service identifier information and first path information, wherein the service identifier information indicates a service queried by either a service initiating device or the service supported by the service initiating device, wherein the second device comprises either the service initiating device or a service forwarding device, and wherein the first path information comprises (a) either identifier information of the service initiating device or identifier information of the second device and (b) the service initiating device;
  determining, by the first device, second path information according to the first path information, wherein the second path information comprises the identifier information of the service initiating device and identifier information of the first device; and
  sending, by the first device, a second service discovery message carrying the service identifier information and the second path information, wherein the first service discovery message further carries identifier change regularity information of the service initiating device, and wherein the identifier change regularity information indicates change regularity of the identifier information of the service initiating device.

8. A terminal device, comprising:
  a memory;
  a transceiver coupled to the memory by a bus system and configured to:
    receive a first service discovery message from a second device, wherein the first service discovery message carries service identifier information and first path information, wherein the service identifier information indicates a service queried by either a service initiating device or the service supported by the service initiating device, wherein the second device comprises either the service initiating device or a service forwarding device, and wherein the first path information comprises (a) either identifier information of the service initiating device or identifier information of the second device and (b) the service initiating device;
    send a second service discovery message carrying the service identifier information and the second path information by:
      sending the second service discovery message in a discovery window (DW) of a neighbor awareness network (NAN) when the terminal device is not located in any NAN data cluster (NDC) in the NAN;
      sending the second service discovery message in a first NDC when the terminal device is located in the first NDC; and
      sending the second service discovery message in at least one of at least two NDCs when the terminal device is located in the at least two NDCs;
    receive a first response message from a third device, wherein the first response message indicates that the third device comprises a service responding device for the service initiating device, wherein the first response message carries third path information, and wherein the third path information comprises the identifier information of the service initiating device and identifier information of the third device;
    send the second response message to the second device;
    broadcast the second response message in the first NDC when the terminal device is located in the first NDC;
    broadcast the second response message in the at least one of the at least two NDCs when terminal device is located in the at least two NDCs;
    send the second response message to the second device;
    broadcast the second response message in the first NDC when the terminal device is located in the first NDC;
    broadcast the second response message in the at least one of the at least two NDCs when terminal device is located in the at least two NDCs; and
  a processor coupled to the memory and the transceiver by the bus system and configured to:
    determine second path information according to the first path information, wherein the second path information comprises the identifier information of the service initiating device and identifier information of the terminal device; and
    determine fourth path information according to the third path information, wherein the fourth path information comprises the identifier information of the service initiating device, the identifier information of the terminal device, and the identifier information of the third device, and wherein the transceiver is further configured to send a second response message carrying the fourth path information.

9. The terminal device of claim 8, wherein a fourth device comprises a device forwarding the first response message, wherein the terminal device is located in the first NDC, wherein the fourth device is located in a second NDC, wherein the transceiver is further configured to receive a third response message from the fourth device, wherein the third response message comprises the first response message, wherein the processor is further configured to determine whether the first NDC and the second NDC are different NDCs, and wherein the transceiver is further configured to:
  broadcast the second response message in the first NDC when the processor determines that the first NDC and the second NDC are different NDCs; and
  broadcast the second response message in the first NDC when the processor determines that the first NDC and the second NDC are the same NDC.

10. The A terminal device, comprising:
  a memory;
  a transceiver coupled to the memory by a bus system and configured to:

receive a first service discovery message from a second device, wherein the first service discovery message carries service identifier information and first path information, wherein the service identifier information indicates a service queried by either a service initiating device or the service supported by the service initiating device, wherein the second device comprises either the service initiating device or a service forwarding device, and wherein the first path information comprises (a) either identifier information of the service initiating device or identifier information of the second device and (b) the service initiating device;

send a second service discovery message carrying the service identifier information and the second path information, wherein the second path information further comprises a first metric measuring quality of a path between the terminal device and the second device, wherein the first metric comprises at least one of the following parameters:

an intersection of a wake-up time of the terminal device and a wake-up time of the second device;

an intersection of a base schedule of an NDC in which the terminal device is located and a base schedule of an NDC in which the second device is located;

a duration of the base schedule of the NDC in which the terminal device is located, a master preference (MP) of the terminal device, and a master rank (MR) of the terminal device; or role information of the terminal device in the NAN.

11. The terminal device of claim 10, wherein the transceiver is further configured to receive a third service discovery message from a fifth device, wherein the third service discovery message carries the service identifier information and fifth path information, wherein the fifth path information comprises the identifier information of the service initiating device, identifier information of the fifth device, and a second metric measuring quality of a path between the terminal device and the fifth device; wherein the processor is further configured to determine, according to the first metric and the second metric, that the path between the terminal device and the second device is better than the path between the terminal device and the fifth device; and wherein the transceiver is further configured to forward the first service discovery message.

12. The terminal device of claim 8, wherein the first service discovery message further carries information regarding at least one of the following:

sleep regularity of the second device;

a sleep time of the second device;

a work regularity of the second device; or a work time of the second device, wherein the processor is further configured to compute a first metric between the terminal device and the second device, wherein the first metric measures quality of a path between the terminal device and the second device.

13. The terminal device of claim 8, wherein the first service discovery message further carries change information in a neighbor awareness network (NAN), wherein the processor is further configured to determine that the terminal device comprises a service responding device for the service initiating device when the service identifier information matches a first service identifier, wherein the service identifier information is generated by the service initiating device according to either (a) service information of the service initiating device or (b) the change information in the NAN and the service information of the service initiating device, wherein the first service identifier being generated by the terminal device according to either (a) service information of the terminal device or (b) the change information in the NAN and the service information of the terminal device, wherein the service information of the service initiating device indicates either (a) information about the service supported by the service initiating device or (b) information about the service queried by the service initiating device, wherein the service information of the terminal device comprises the information about the service queried by the terminal device when the service information of the service initiating device comprises the information about the service supported by the service initiating device, wherein the service information of the terminal device comprises the information about the service supported by the terminal device when the service information of the service initiating device comprises the information about the service queried by the service initiating device, and wherein the change information in the NAN comprising at least one of the following information:

an anchor master rank (AMR);

a master rank (MR);

a master preference (MP);

an anchor master preference (AMP);

a random factor (RF);

an anchor master beacon transmission time (AMBTT);

a time synchronization function (TSF) value;

a cluster identifier;

a cluster grade (CG); or a group key.

14. A terminal device, comprising:

a memory;

a transceiver coupled to the memory by a bus system and configured to:

receive a first service discovery message from a second device, wherein the first service discovery message carries service identifier information and first path information, wherein the service identifier information indicates a service queried by either a service initiating device or the service supported by the service initiating device, wherein the second device comprises either the service initiating device or a service forwarding device, and wherein the first path information comprises (a) either identifier information of the service initiating device or identifier information of the second device and (b) the service initiating device;

send a second service discovery message carrying the service identifier information and the second path information, wherein the first service discovery message further carries identifier change regularity information of the service initiating device, wherein the identifier change regularity information indicates change regularity of the identifier information of the service initiating device to enable a device receiving the first service discovery message to identify the service initiating device according to the identifier change regularity information or to update the identifier information of the service initiating device according to the identifier change regularity information after the identifier information of the service initiating device changes.

* * * * *